United States Patent
Chopra et al.

(10) Patent No.: US 12,528,821 B2
(45) Date of Patent: Jan. 20, 2026

(54) pH-DEPENDENT COMPOSITION MATTERS USEFUL FOR STUDY AND DIAGNOSIS OF ALZHEIMER'S DISEASE

(71) Applicant: Purdue Research Foundation, West Lafayette, IN (US)

(72) Inventors: Gaurav Chopra, West Lafayette, IN (US); Krupal Jethava, West Lafayette, IN (US); Priya Prakash, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 1090 days.

(21) Appl. No.: 17/598,509

(22) PCT Filed: Mar. 27, 2020

(86) PCT No.: PCT/US2020/025113
§ 371 (c)(1),
(2) Date: Sep. 27, 2021

(87) PCT Pub. No.: WO2020/205465
PCT Pub. Date: Oct. 8, 2020

(65) Prior Publication Data
US 2022/0162225 A1    May 26, 2022

Related U.S. Application Data

(60) Provisional application No. 62/826,526, filed on Mar. 29, 2019.

(51) Int. Cl.
*C07D 491/22* (2006.01)
*G01N 33/58* (2006.01)
*G01N 33/84* (2006.01)

(52) U.S. Cl.
CPC ......... *C07D 491/22* (2013.01); *G01N 33/582* (2013.01); *G01N 33/84* (2013.01)

(58) Field of Classification Search
CPC .... C07D 491/22; G01N 33/582; G01N 33/84; G01N 2333/4709; G01N 2800/2821; A61P 25/28; C07F 5/022
See application file for complete search history.

(56) References Cited

U.S. PATENT DOCUMENTS

2018/0079828 A1* 3/2018 Kellogg ............. A61K 47/6851
2018/0238912 A1* 8/2018 Dzubay ................. C07K 1/13

OTHER PUBLICATIONS

Jungbauer et al., J Mol Recognit. 2009; 22(5):403-413 (Year: 2009).*
Lin et al., Anal Biochem. Jul. 15, 2001: 2924(2) (Year: 2001).*
Nimmerjahn, A.; Kirchhoff, F.; Helmchen, F. Resting Microglial Cells Are Highly Dynamic Surveillants of Brain Parenchyma in Vivo. Science 2005, 308 (5726), 1314-1318.
Hanke, M. L.; Kielian, T. Toll-like Receptors in Health and Disease in the Brain: Mechanisms and Therapeutic Potential. Clin. Sci. (Lond). 2011, 121 (9), 367-387.
Bachstetter, A. D.; Van Eldik, L. J.; Schmitt, F. A.; Neltner, J. H.; Ighodaro, E. T.; Webster, S. J.; Patel, E.; Abner, E. L.; Kryscio, R. J.; Nelson, P. T.; et al. Disease-Related Microglia Heterogeneity in the Hippocampus of Alzheimer's Disease, Dementia with Lewy Bodies, and Hippocampal Sclerosis of Aging. Acta Neuropathol. Commun. 2015, 3, 32.
Liddelow, S. A.; Guttenplan, K. A.; Clarke, L. E.; Bennett, F. C.; Bohlen, C. J.; Schirmer, L.; Bennett, M. L.; Münch, A. E.; Chung, W.-S.; Peterson, T. C.; et al. Neurotoxic Reactive Astrocytes Are Induced by Activated Microglia. Nature 2017, 541 (7638), 481-487.
Heneka, M. T.; Carson, M. J.; Khoury, J. El; Landreth, G. E.; Brosseron, F.; Feinstein, D. L.; Jacobs, A. H.; Wyss-Coray, T.; Vitorica, J.; Ransohoff, R. M.; et al. Neuroinflammation in Alzheimer's Disease. The Lancet Neurology. 2015, pp. 388-405.
Jones, R. S.; Minogue, A. M.; Connor, T. J.; Lynch, M. A. Amyloid-β-Induced Astrocytic Phagocytosis Is Mediated by CD36, CD47 and RAGE. J. Neuroimmune Pharmacol. 2013, 8 (1), 301-311.
Hassan, S.; Eldeeb, K.; Millns, P. J.; Bennett, A. J.; Alexander, S. P. H.; Kendall, D. A. Cannabidiol Enhances Microglial Phagocytosis via Transient Receptor Potential (TRP) Channel Activation. Br. J. Pharmacol. 2014, 171 (9), 2426-2439.
Galatro, T. F.; Holtman, I. R.; Lerario, A. M.; Vainchtein, I. D.; Brouwer, N.; Sola, P. R.; Veras, M. M.; Pereira, T. F.; Leite, R. E. P.; Möller, T.; et al. Transcriptomic Analysis of Purified Human Cortical Microglia Reveals Age-Associated Changes. Nat. Neurosci. 2017, 20 (8), 1162-1171.
Liu, S.; Liu, Y.; Hao, W.; Wolf, L.; Kiliaan, A. J.; Penke, B.; Rube, C. E.; Walter, J.; Heneka, M. T.; Hartmann, T.; et al. TLR2 Is a Primary Receptor for Alzheimer's Amyloid Peptide to Trigger Neuroinflammatory Activation. J. Immunol. 2012, 188 (3), 1098-1107.

(Continued)

*Primary Examiner* — Robert S Cabral
(74) *Attorney, Agent, or Firm* — Purdue Research Foundation

(57) ABSTRACT

The present invention generally relates to a composition matter useful for diagnosis and treatment of Alzheimer's disease comprising A-L-F or a pharmaceutically acceptable salt thereof, wherein A is beta-amyloid peptide or a fragment thereof, L is an optional linker and F is a pH-responsive fluorophore, dye, or a therapeutic agent. Composition matters, methods of use as well as a kit for diagnosis and/or treatment of Alzheimer's disease are within the scope of this disclosure.

10 Claims, 18 Drawing Sheets
Specification includes a Sequence Listing.

(56) References Cited

OTHER PUBLICATIONS

Zhao, Y.; Wu, X.; Li, X.; Jiang, L.-L.; Gui, X.; Liu, Y.; Sun, Y.; Zhu, B.; Piña-Crespo, J. C.; Zhang, M.; et al. TREM2 Is a Receptor for β-Amyloid That Mediates Microglial Function. Neuron 2018, 97 (5), 1023-1031.e7.

Ajami, B.; Samusik, N.; Wieghofer, P.; Ho, P. P.; Crotti, A.; Bjornson, Z.; Prinz, M.; Fantl, W. J.; Nolan, G. P.; Steinman, L. Single-Cell Mass Cytometry Reveals Distinct Populations of Brain Myeloid Cells in Mouse Neuroinflammation and Neurodegeneration Models. Nat. Neurosci. 2018, 21 (4), 541-551.

* cited by examiner

Legend: ■ 1.0 μM ▨ 5.0 μM

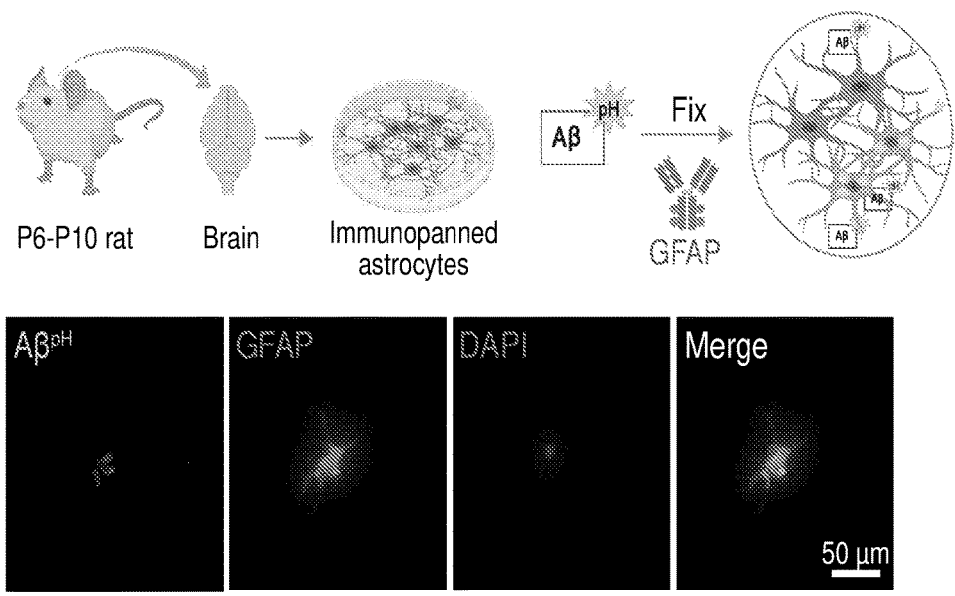
Fig. 9D
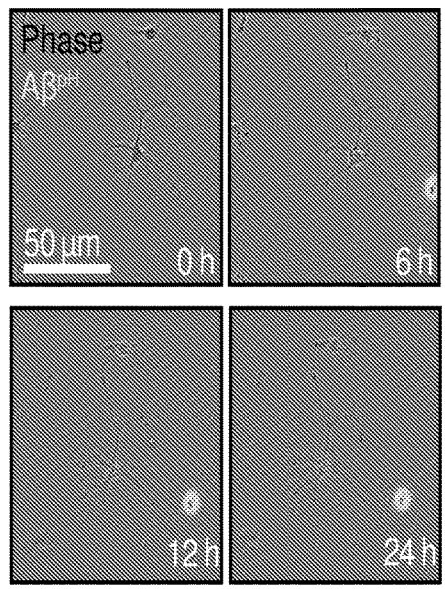
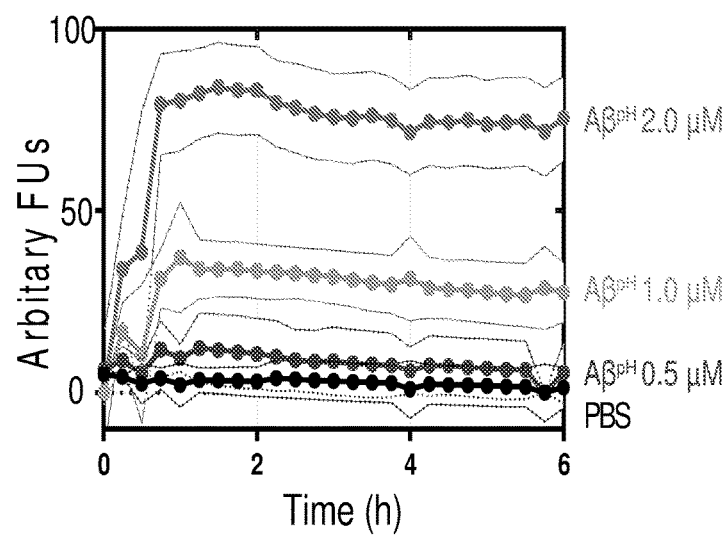
Fig. 9E
Fig. 9F pH-DEPENDENT COMPOSITION MATTERS USEFUL FOR STUDY AND DIAGNOSIS OF ALZHEIMER'S DISEASE

CROSS REFERENCE TO RELATED APPLICATIONS

This present U.S. patent U.S. patent application is a national stage entry under 35 U.S.C. § 371(b) of International Application No. PCT/US20/25113, filed on Mar. 27, 2020, which relates to and claims the priority benefits of U.S. Provisional Application Ser. No. 62/826,526, filed Mar. 29, 2019, the content of which is hereby incorporated by reference in its entirety into this instant disclosure.

STATEMENT OF SEQUENCE LISTING

Applicant asserts that the same Sequence Listing is provided in computer readable form encoded in a file filed herewith and herein incorporated by reference. The information recorded in computer readable form is identical to the written Sequence Listing provided herein, pursuant to 37 C.F.R. § 1.821(f).

TECHNICAL FIELD

This invention generally relates to a composition matter useful for the study and diagnosis of Alzheimer's disease comprising A-L-F, wherein A is beta-amyloid peptide or a fragment thereof, L is an optional linker and F is a pH-responsive fluorophore or dye. Methods of use and a kit for diagnosis of Alzheimer's disease are within the scope of this disclosure.

BACKGROUND AND BRIEF SUMMARY OF INVENTIONS

This section introduces aspects that may help facilitate a better understanding of the disclosure. Accordingly, these statements are to be read in this light and are not to be understood as admissions about what is or is not prior art.

Amyloid beta (Aβ) aggregate plays a crucial role in the initiation and development of Alzheimer's disease. In a healthy brain, activated microglia clear the accumulated Aβ by phagocytosis. Commonly used reagents to understand the phagocytic function of microglia in vitro include fluorescent-labeled latex beads, E. coli particles, zymosan particles, and Aβ peptides. Even though the fluorescent-labeled Aβ peptides confers specificity to the microglia in the Alzheimer's brain microenvironment compared to the other particles, studying the phagocytic process is hindered by the sustained fluorescence and inability to distinguish between Aβ inside the cell versus on the cell surface. Microglia engulfs Aβ by forming extended cellular processes that form specialized acidic organelles called phagosomes within the cells. Phagosomes ultimately integrate with the acidic lysosomes within the cells and form "phagolysosomes" rendering the Aβ ready for enzymatic degradation. This provides a unique opportunity to identify Aβ-containing acidic phagosomes within the phagocytic microglia by utilizing pH-sensitive sensors. To the best of our knowledge, Aβ peptides with pH-dependent fluorescent probes have not been reported so far. There are unmet diagnostic needs in Alzheimer's disease research.

Hence, to identify and visualize phagocytosis of Aβ by microglial cells, we have designed and developed a pH-sensitive fluorescent Aβ-dye conjugate. The fluorescent property of this dye is pH dependent i.e. non-fluorescent at neutral physiological pH of a cell or a biological system (~7.4) but gives a strong green fluorescence signal in the acidic pH, ranging from about pH 2 to about pH 5, microenvironment of the phagosome. Thus, after phagocytosis of Aβ coupled with a fluorescent dye, we could track Aβ uptake by microglial cells.

BRIEF DESCRIPTION OF THE DRAWINGS

Embodiments of the present disclosure will now be described by way of example in greater detail with reference to the attached Figures, in which:

(FIG. 8A) The pH-sensitivity of the Aβ$^{pH}$ probe characterized at different concentrations from 0.1 μM to 5.0 μM. Increased fluorescence is observed within the narrow range of pH 2.0 to 5.0. (FIG. 8B) Atomic Force Microscopy topographic images of synthetic Aβ oligomers. Left-2D topographic image of synthetic Aβ oligomers. Right-3D image (2×2 μm x-y). (FIG. 8C) Atomic Force Microscopy topographic images of Aβ$^{pH}$ oligomers. Left-2D topographic image of Aβ$^{pH}$. Right-3D image (2×2 μm x-y). (FIG. 8D) Live cell imaging of the phagocytic uptake of 1 μM Aβ$^{pH}$ by BV2 and N9 mouse microglia and by HMC3 human microglia over 24 h. (FIG. 8E) Quantification of Aβ$^{pH}$ phagocytic score by BV2, N9, and HMC3 microglial cells from the live cell images. (FIG. 8F) The phagocytic uptake of Aβ$^{pH}$ by BV2 cells is measured and quantified via flow cytometry analysis. Dot plot shows live (PI⁻) and Aβ$^{pH+}$ cells. No green fluorescence is measured in unstained cells (UC) and in cells stained with the PI live/dead stain only whereas green fluorescence is measured in cells treated with 0.5 and 1.0 μM Aβ$^{pH}$ for 1 hour. Data shown in terms of % max, by scaling each curve to mode=100% (y-axis).

FIGS. 9A-9F demonstrated that Fluorescence of internalized Aβ$^{pH}$ is retained in fixed cells. (FIG. 9A) Confocal images of fixed HMC3, N9, and BV2 cells showing the uptake of Aβ$^{pH}$ (green). Cells are stained for acidic intracellular organelles (LysoTracker Red, confirming co-localization of the Aβ$^{pH}$ within the acidic intracellular organelles) and nuclei (DAPI, blue). No antibody is required to detect Aβ. (FIG. 9B) Primary mouse microglia grown in defined, reduced-serum media phagocytose Aβ$^{pH}$ ex vivo. Cells are fixed and stained for nuclei and show Aβ pH colocalized in the acidic organelles with LysoTracker Red. (FIG. 9C) The phagocytic uptake of Aβ$^{pH}$ by primary microglia is measured and quantified via flow cytometry analysis. Dot plot shows live (ZV$^-$) and Aβ$^{pH+}$ cells. No green fluorescence is measured in unstained cells (UC) and cells stained with the ZV live/dead stain only whereas green fluorescence is measured in cells treated with 0.5, 1.0, and 2.0 µM Aβ$^{pH}$ for 1 hour. Data shown in terms of % max, by scaling each curve to mode=100% (y-axis). (FIG. 9D) Primary immunopanned rat astrocytes also phagocytose Aβ$^{pH}$ in serum-free conditions. Cells are fixed and stained for astrocyte specific GFAP antibody (red) and nuclei. (FIG. 9E) Uptake of Aβ$^{pH}$ over time by primary immunopanned astrocytes as observed in live cells in real time. (FIG. 9F) Quantification of uptake of 0.5, 1.0, and 2.0 µM Aβ$^{pH}$ by primary astrocytes.

(FIG. 10A) Schematic of phagocytosis assay in rat hippocampal tissue slices. (FIG. 10B) Quantification of Aβ$^{pH}$ colocalized with microglia and astrocytes, as defined by IBA1$^+$ and GFAP$^+$ staining, respectively. Data shown as mean±s.e.m. collected from 20 and 8 slices for microglia and astrocytes respectively. (FIG. 10C) Representative 2D maximum projection of a confocal z-stack showing microglia phagocytosing Aβ$^{pH}$. Closeup of the indicated cell (yellow square) is shown on the right. Orthogonal projections at the level of the crosshairs show internalization of Aβ$^{pH}$ within the microglia. (FIG. 10D) Representative 2D maximum projection of a confocal z-stack showing astrocytes phagocytosing Aβ$^{pH}$. Closeup of the indicated cell (yellow square) is shown on the right. Orthogonal projections at the level of the crosshairs show internalization of Aβ$^{pH}$ within the astrocyte.

(FIG. 11A) Schematic of stereotaxic microinjection of Aβ$^{pH}$ in the somatosensory cortex of P7 mouse followed by staining of fixed tissue section after 24 and 72 hours. (FIG. 11B) Phagocytic uptake of Aβ$^{pH}$ by IBA1$^+$ microglia and GFAP$^+$ astrocytes in the periventricular white matter at the 24 h timepoint. (FIG. 11C) IBA1$^+$ microglia show bright green fluorescence at 72 h in the same region indicating presence of Aβ$^{pH}$ within the cells at this timepoint. GFAP$^+$ astrocytes do not show any green fluorescence in this region at this timepoint suggesting either degradation of the peptide or insufficient Aβ$^{pH}$ concentration for detectable phagocytic uptake by these cells. (FIG. 11D) Quantification of Aβ$^{pH}$ fluorescence within microglia and astrocytes located in the pia and white matter regions show more Aβ$^{pH}$ uptake by microglia compared to astrocytes. (FIG. 11E) Schematic of subretinal injection of Aβ$^{pH}$ to evaluate its in vivo uptake by retinal microglia and astrocytes. (FIG. 11F) GFAP$^+$ rat retinal astrocytes phagocytose Aβ$^{pH}$ in vivo. (FIG. 11G) Quantification of Aβ$^{pH}$ uptake retinal IBA1$^+$ microglia and GFAP$^+$ astrocytes. No fluorescence was detected in astrocytes at these 3 time points (n.d.). Data shown as mean±s.d. from 2 animals.

(FIG. 12A) Schematic of how Aβ$^{pH}$ phagocytic uptake is imaged through a cranial window in vivo in real time using two photon excitation microscopy. (FIG. 12B) In vivo two-photon imaging of the mouse barrel cortex before and after topical application of Aβ$^{pH}$. The fluorescence increases in cell somata (indicated by red circles) reflecting Aβ$^{pH}$ uptake. (FIG. 12C) Quantification of mean Aβ$^{pH}$ fluorescence in cell somata over time. The data were normalized to the maximum mean Aβ$^{pH}$ fluorescence for each cell and then averaged. Data shown as mean±s.e.m. N=59 somata from 2 animals. (FIG. 12D) 1.5 to 3 hours after in vivo two-photon imaging of Aβ$^{pH}$, animals were perfusion-fixed and cortical slices were stained for microglia, microglia lysosomes/endosomes and astrocytes using IBA1, CD68, and GFAP antibodies, respectively. (FIG. 12E) Quantification of Aβ$^{pH}$ colocalization with IBA1, CD68, and GFAP suggests that most Aβ$^{pH}$ is taken up by microglia and astrocytes in vivo. Data shown as mean±s.e.m. N=12 stacks from 3 animals.

Figure 1A:
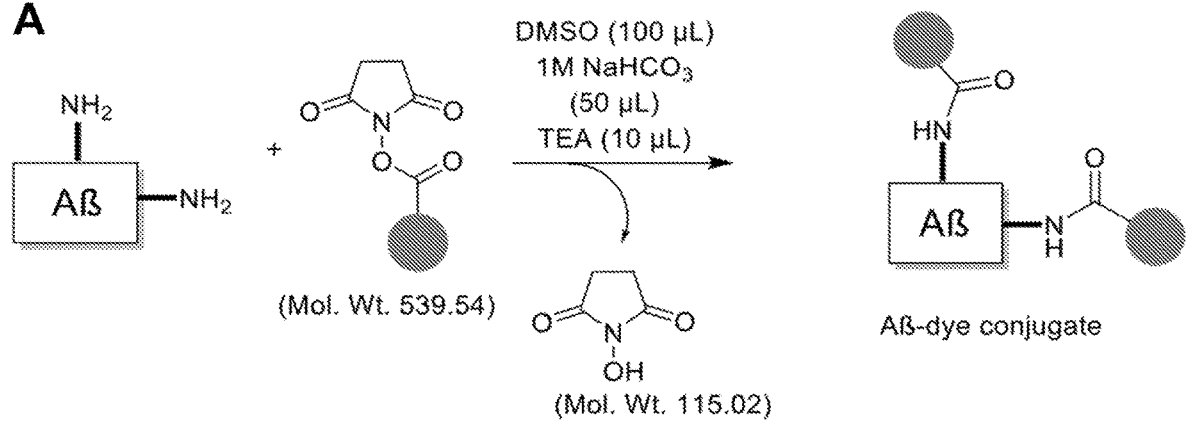
FIG. 1A shows synthesis scheme of pH-dependent fluorescent conjugate of human Aβ1-42, hAβ$^{pH}$.

```
BRIEF DESCRIPTION OF SEQUENCE LISTING
SEQ ID NO: 1, Amyloid beta 1-42, human:
DAEFRHDSGYEVHHQKLVFFAEDVGSNKGAIIGLMVGGVVIA;

SEQ ID NO: 2, Amyloid beta 2-42, human:
AEFRHDSGYEVHHQKLVFFAEDVGSNKGAIIGLMVGGVVIA;

SEQ ID NO: 3, Amyloid beta 3-42, human:
EFRHDSGYEVHHQKLVFFAEDVGSNKGAIIGLMVGGVVIA;

SEQ ID NO: 4, Amyloid beta 4-42, human,
FRHDSGYEVHHQKLVFFAEDVGSNKGAIIGLMVGGVVIA;

SEQ ID NO: 5, Amyloid beta 5-42, human,
RHDSGYEVHHQKLVFFAEDVGSNKGAIIGLMVGGVVIA;

SEQ ID NO: 6, Amyloid beta 9-42, human,
GYEVHHQKLVFFAEDVGSNKGAIIGLMVGGVVIA;

SEQ ID NO: 7, Amyloid beta 11-42, human,
EVHHQKLVFFAEDVGSNKGAIIGLMVGGVVIA;

SEQ ID NO: 8, Amyloid beta 20-42, human, mouse,
and rat,
FAEDVGSNKGAIIGLMVGGVVIA;

SEQ ID NO: 9, Amyloid beta 22-42, human, mouse,
and rat,
EDVGSNKGAIIGLMVGGVVIA;

SEQ ID NO: 10, Amyloid beta 23-42, human, mouse,
and rat:
DVGSNKGAIIGLMVGGVVIA;

SEQ ID NO: 11, Amyloid beta 1-40, human,
DAEFRHDSGYEVHHQKLVFFAEDVGSNKGAIIGLMVGGVV;

SEQ ID NO: 12, Amyloid beta 1-28, human:
DAEFRHDSGYEVHHQKLVFFAEDVGSNK

SEQ ID NO: 13, Amyloid beta 25-35, rat and mouse:
GSNKGAIIGLM;

SEQ ID NO: 14, Amyloid beta 11-22, rat and mouse:
EVHHQKLVFFAE;

SEQ ID NO: 15, Amyloid beta 1-42, rat and mouse:
DAEFGHDSGFEVRHQKLVFFAEDVGSNKGAIIGLMVGGVVIA;

SEQ ID NO: 16, Amyloid beta 1-40, rat and mouse,
DAEFGHDSGFEVRHQKLVFFAEDVGSNKGAIIGLMVGGVV
```

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 20%, within 10%, within 5%, or within 1% of a stated value or of a stated limit of a range.

In the present disclosure the term "substantial" or "substantially" can allow for a degree of variability in a value or range, for example, within 80%, within 90%, within 95%, or within 99% of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is a beta-amyloid peptide of human or an animal.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is human beta-amyloid peptide, SEQ ID NO: 1, or a fragment of any continuous 11 or more amino acid residues thereof.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is a beta-amyloid peptide of mouse.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is rat beta-amyloid peptide, SEQ ID NO: 15, or a fragment of any continuous 11 or more amino acid residues thereof.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is a beta-amyloid peptide of a nonhuman primate.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said optional linker is absent or comprises

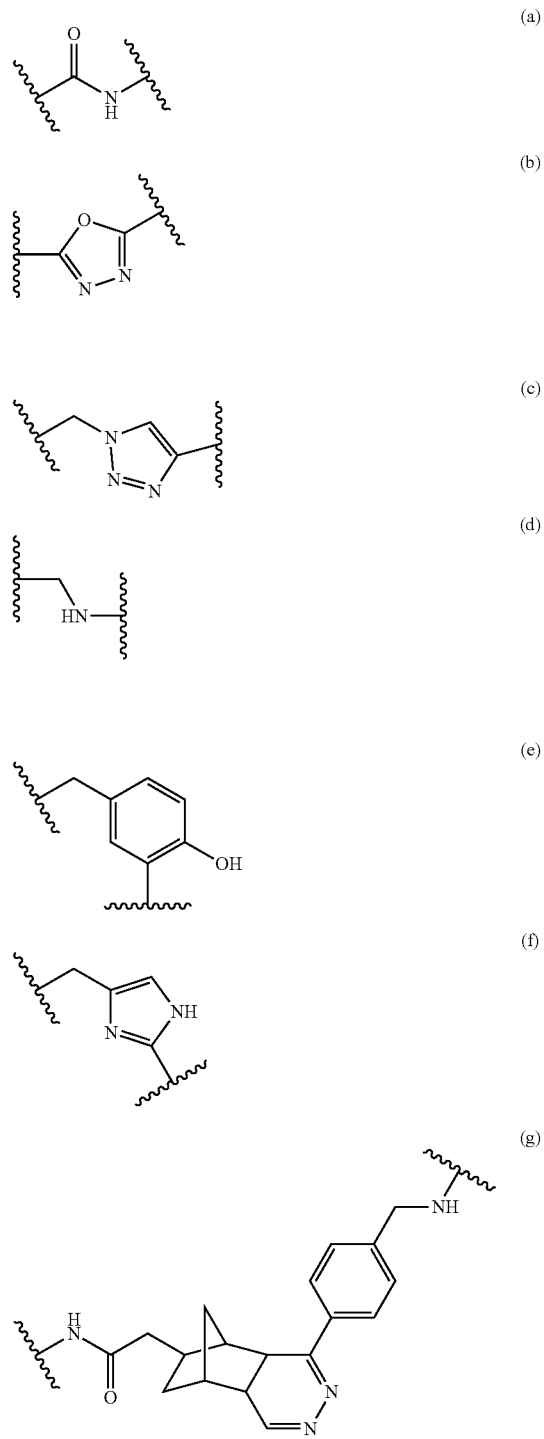

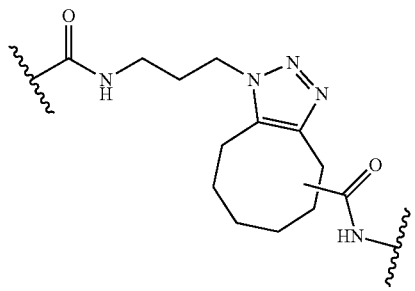
(h)

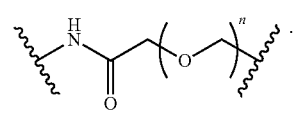
(i)

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said pH-responsive fluorophore comprises

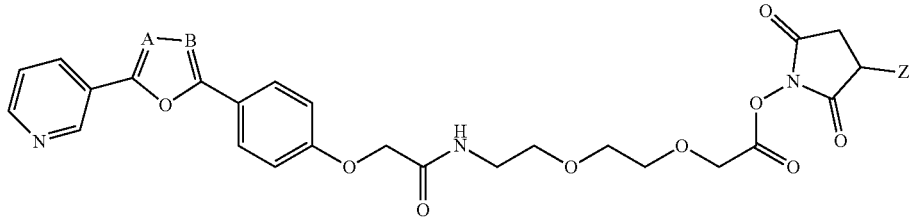

A and B = N or C

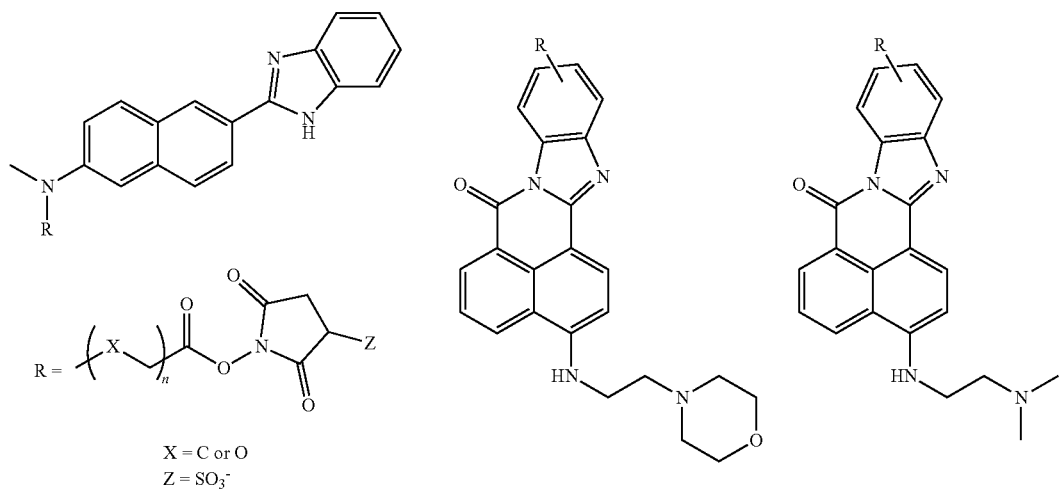

X = C or O
Z = $SO_3^-$ or an acceptable salt thereof.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said pH-responsive dye is a near-infra red dye.

In some aspects, this invention relates to a composition matter for facilitating Alzheimer's disease research comprising A-L-F or a pharmaceutically acceptable salt thereof, wherein A is beta-amyloid peptide or a fragment thereof, L is an optional linker and F is a pH-responsive fluorophore or dye, wherein said pH-responsive near-infra red dye comprises

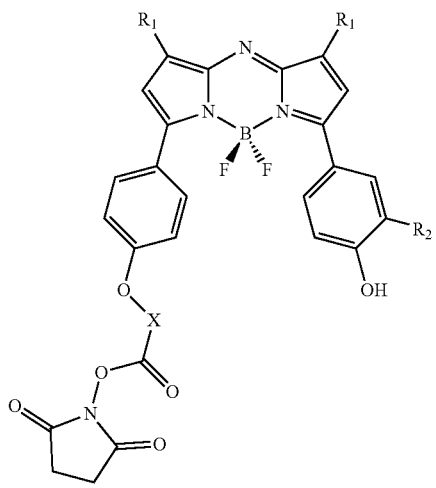

A $R_1$ = Ph, 4-Fluoro Phenyl,
1-methyl-4-phenylpiperazine,
4-phenylpiperazine,
4-phenylmorpholine,
4-phenyl dialkylamine
$R_1$ = $NO_2$, H
n = $CH_2$, PEG linker

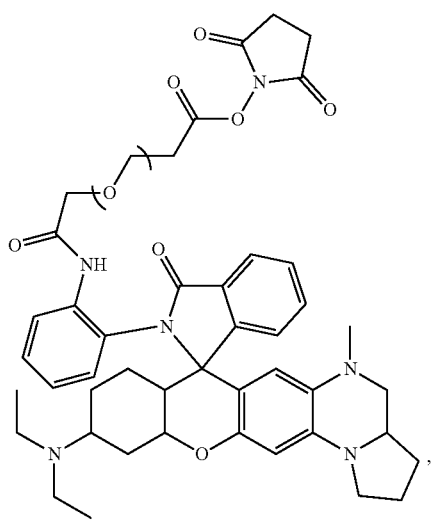

B

In some other aspects, this invention relates to a method for diagnosis of Alzheimer's disease using the composition matter disclosed herein.

In some other aspects, this invention relates to a method for diagnosis of Alzheimer's disease comprising the steps of
 a. preparing a composition matter comprising A-L-F, wherein A is beta-amyloid peptide or a fragment thereof, L is an optional linker and F is a pH-responsive fluorophore or dye;
 b. applying said composition matter to a sample of a study subject and collecting related imaging data;
 c. analyzing said imaging data and comparing with that of a healthy subject; and
 d. concluding disease state of said study subject.

In some other aspects, this invention relates to a method for diagnosis of Alzheimer's disease as disclosed herein, wherein said beta-amyloid peptide is the beta-amyloid peptide of human or an animal.

In some other aspects, this invention relates to a method for diagnosis of Alzheimer's disease as disclosed herein, wherein said beta-amyloid peptide is human beta-amyloid peptide, SEQ ID NO: 1, or a fragment of any continuous 11 or more amino acid residues thereof.

In some other aspects, this invention relates to a method for diagnosis of Alzheimer's disease as disclosed herein, wherein said beta-amyloid peptide is a mouse beta-amyloid peptide, or a fragment of any continuous 11 or more amino acid residues thereof.

In some other aspects, this invention relates to a method for diagnosis of Alzheimer's disease as disclosed herein, wherein said beta-amyloid peptide is rat beta-amyloid peptide, SEQ ID NO: 15, or a fragment of any continuous 11 or more amino acid residues thereof.

In some other aspects, this invention relates to a method for diagnosis of Alzheimer's disease as disclosed herein, wherein said beta-amyloid peptide is monkey beta-amyloid peptide, or a fragment of any continuous 11 or more amino acid residues thereof.

In some other aspects, this invention relates to a method for diagnosis of Alzheimer's disease as disclosed herein, wherein said optional linker is absent or comprises

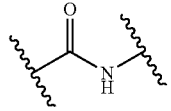 (a)

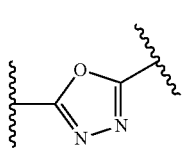 (b)

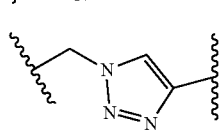 (c)

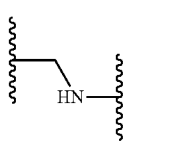 (d)

or an acceptable salt thereof.

11
-continued
(e)
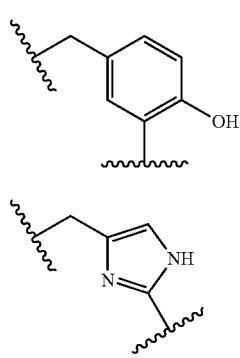
(f)
(g)
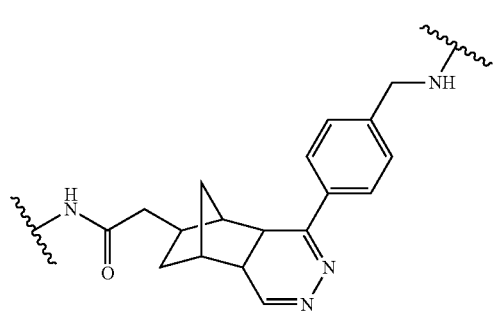
12
-continued
(h)
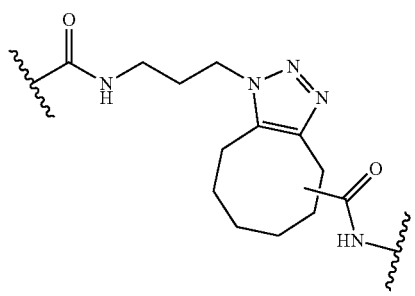
(i)
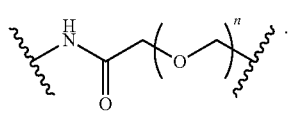
In some other aspects, this invention relates to a method for diagnosis of Alzheimer's disease as disclosed herein, wherein said pH-responsive fluorophore comprises
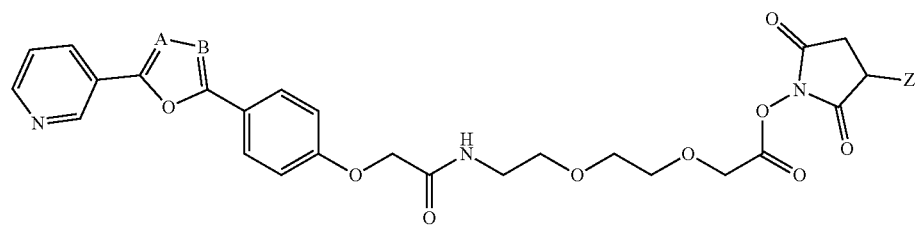
A and B = N or C
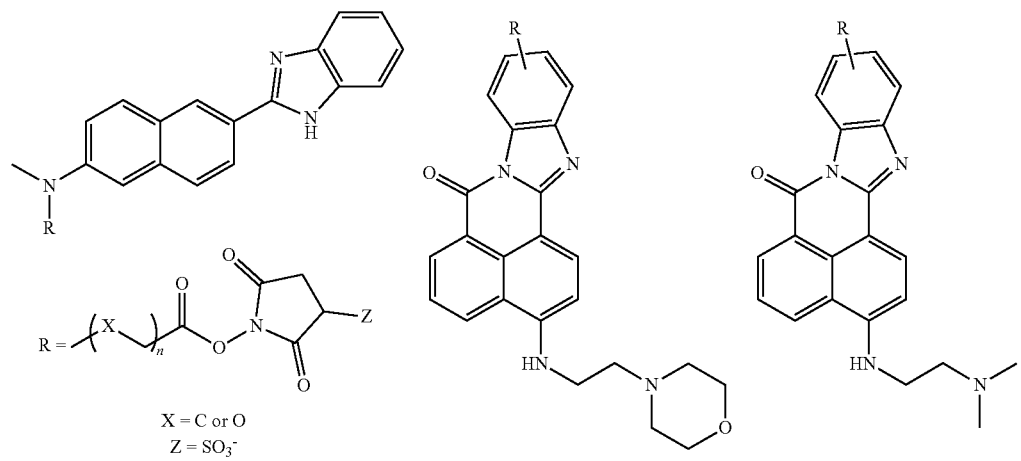
X = C or O
Z = $SO_3^-$
or an acceptable salt thereof.

In some other aspects, this invention relates to a method for diagnosis of Alzheimer's disease as disclosed herein, wherein said pH-responsive dye is a near-infra red dye.

In some other aspects, this invention relates to a method for diagnosis of Alzheimer's disease as disclosed herein, wherein said pH-responsive near-infra red dye comprises

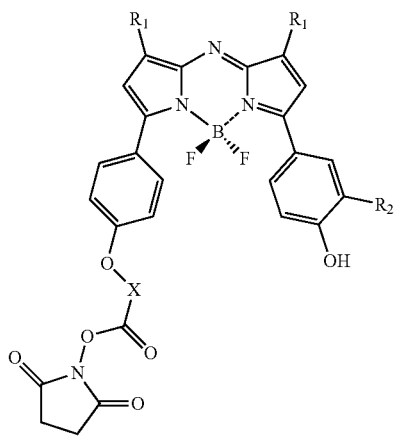

A $R_1$ = Ph, 4-Fluoro Phenyl,
1-methyl-4-phenylpiperazine,
4-phenylpiperazine,
4-phenylmorpholine,
4-phenyl dialkylamine
$R_1$ = $NO_2$, H
n = $CH_2$, PEG linker

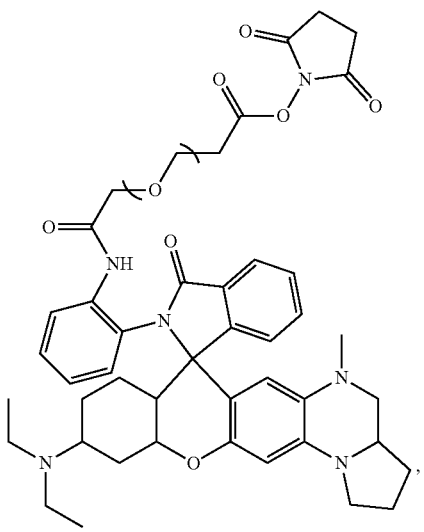

B or an acceptable salt thereof.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is the beta-amyloid peptide of human or an animal.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is human beta-amyloid peptide, SEQ ID NO: 1, or a fragment of any continuous 11 or more amino acid residues thereof.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is a mouse beta-amyloid peptide, or a fragment of any continuous 11 or more amino acid residues thereof.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is rat beta-amyloid peptide, SEQ ID NO: 15, or a fragment of any continuous 11 or more amino acid residues thereof.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said beta-amyloid peptide is a monkey beta-amyloid peptide, or a fragment of any continuous 11 or more amino acid residues thereof.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said optional linker is absent or comprises

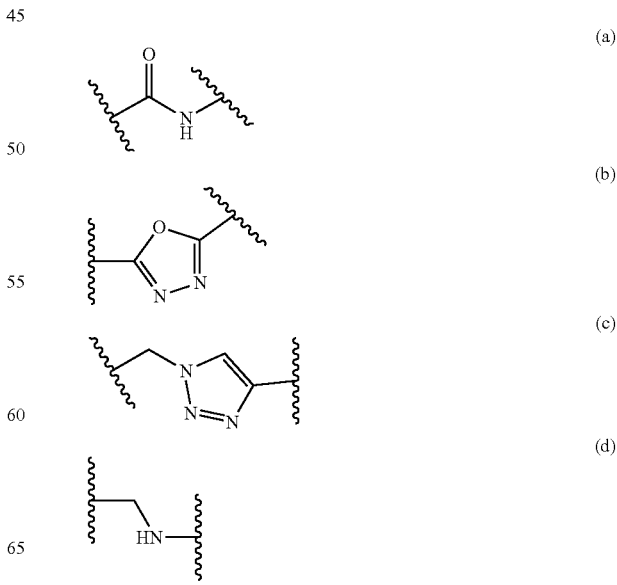

-continued (e)
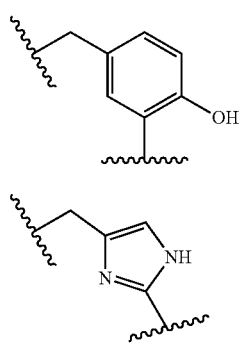

(f)

(g)
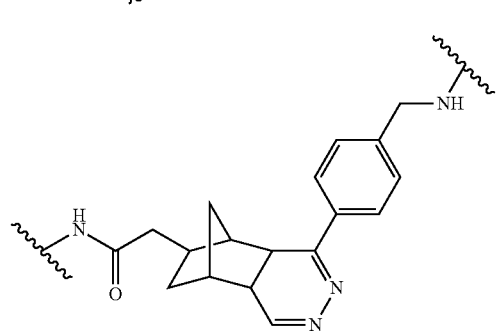

-continued (h)
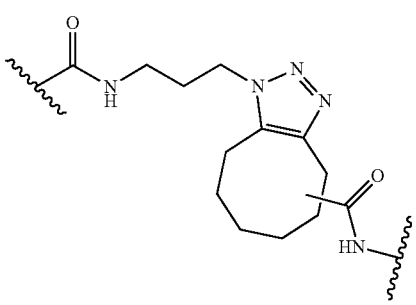

(i)
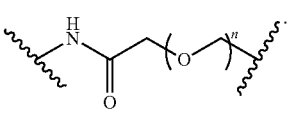

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said pH-responsive fluorophore comprises

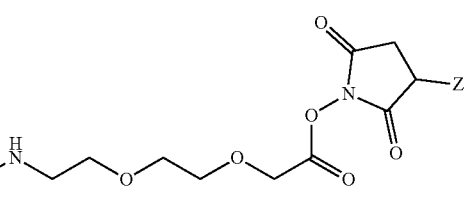

A and B = N or C

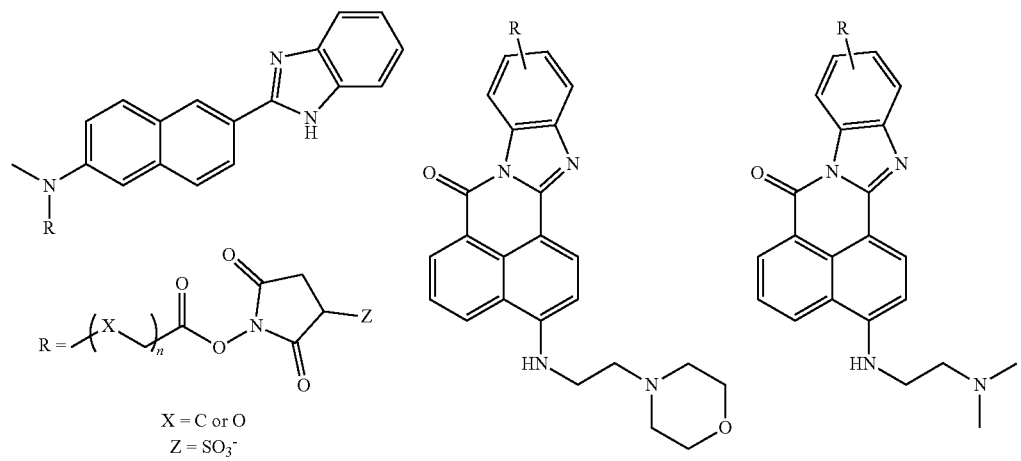

or an acceptable salt thereof.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said pH-responsive dye is a near-infra red dye.

In some other aspects, this invention relates to a kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye, wherein said pH-responsive near-infra red dye comprises A
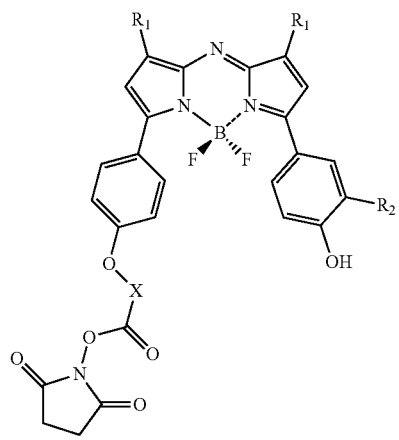

$R_1$ = Ph, 4-Fluoro Phenyl,
1-methyl-4-phenylpiperazine,
4-phenylpiperazine,
4-phenylmorpholine,
4-phenyl dialkylamine
$R_1$ = $NO_2$, H
n = $CH_2$, PEG linker B
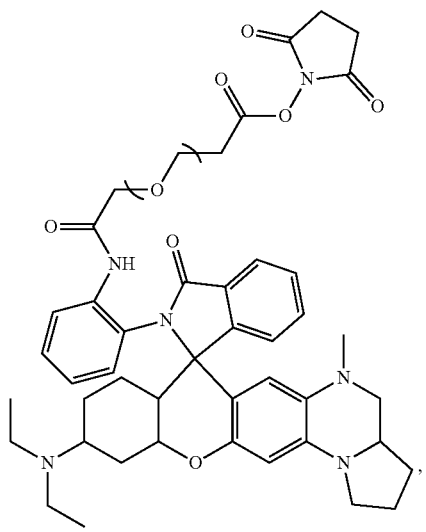

or an acceptable salt thereof.

In some other aspects, this invention relates to a pharmaceutical composition comprising A-L-F or a pharmaceutically acceptable salt thereof as disclosed herein, wherein A is beta-amyloid peptide or a fragment thereof, L is an optional linker and F is a therapeutic agent for treatment of Alzheimer's disease, together with one or more pharmaceutically acceptable diluents, excipients, or carriers.

In some other aspects, this invention relates to a pharmaceutical composition comprising A-L-F or a pharmaceutically acceptable salt thereof as disclosed herein, wherein said beta-amyloid peptide is a beta-amyloid peptide of human or an animal.

In some other aspects, this invention relates to a pharmaceutical composition comprising A-L-F or a pharmaceutically acceptable salt thereof as disclosed herein, wherein said beta-amyloid peptide is human beta-amyloid peptide, SEQ ID NO: 1, or a fragment of any continuous 11 or more amino acid residues thereof.

In some other aspects, this invention relates to a pharmaceutical composition comprising A-L-F or a pharmaceutically acceptable salt thereof as disclosed herein, wherein said beta-amyloid peptide is a beta-amyloid peptide of mouse or rat.

In some other aspects, this invention relates to a pharmaceutical composition comprising A-L-F or a pharmaceutically acceptable salt thereof as disclosed herein, wherein said beta-amyloid peptide is rat beta-amyloid peptide, SEQ ID NO: 15, or a fragment of any continuous 11 or more amino acid residues thereof.

In some other aspects, this invention relates to a pharmaceutical composition comprising A-L-F or a pharmaceutically acceptable salt thereof as disclosed herein, wherein said optional linker is absent or comprises (a)
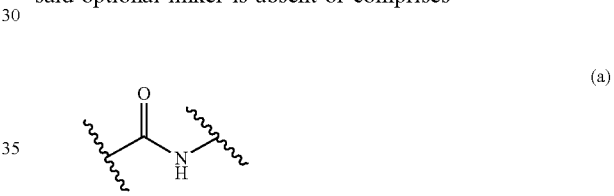

(b)

(c)
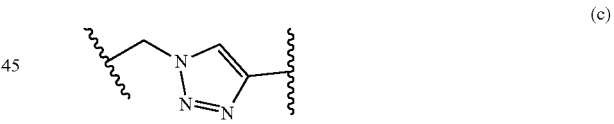

(d)

(e)
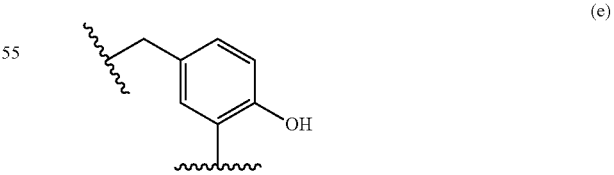

(f)
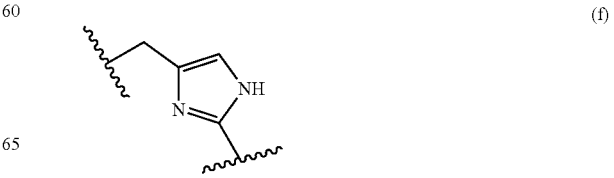

-continued

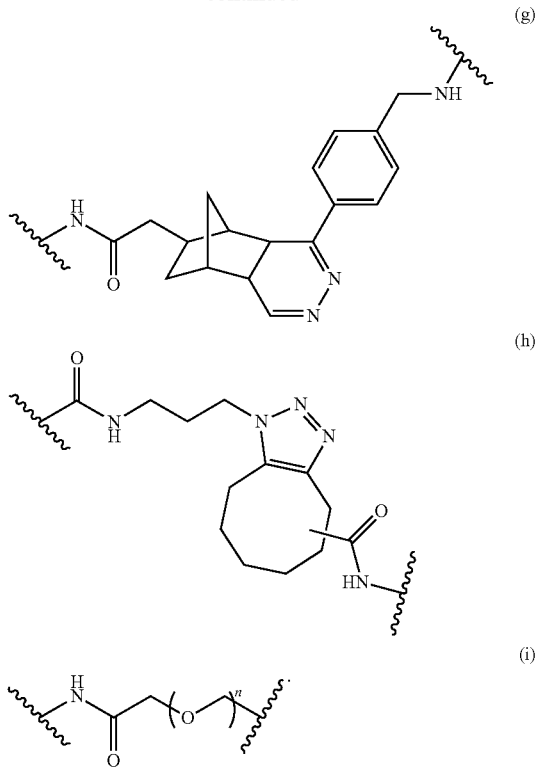

In some aspects, it is to be understood that the beta-amyloid peptide may be from different species—mouse, rat, human, non-human primates (monkey)—the non-human primates can be used as the animal model for Alzheimer's disease along with mouse and rat. The human pH-dependent beta-amyloid peptide conjugate (pH-Abeta) may be used for mouse and rat brains via injections for diagnostics and other research purposes.

Microglia are the resident-macrophages of the Central Nervous System (CNS) that respond to pathogens and injury by clearing cell debris, misfolded proteins, and damaged neurons from their microenvironment by the process of phagocytosis.[1] Mature microglia in the adult brain exhibit a ramified morphology and constantly survey their environment for "eat me" signals[2] released from apoptotic cells, microbes, protein deposits, etc. During phagocytosis, certain proteins on microglial cell surface like the Toll-Like Receptors (TLRs), Fc receptors, Scavenger receptors CD36, CD47, receptor for advanced glycation end products (RAGE) etc. recognize the "eat-me" signals and engulf the target prey particles into intracellular compartments called phagosomes.[3-5] Eventually, the phagosomes mature by integrating with lysosomes and present the phagocytosed material for enzymatic degradation. The maturation of the phagosome during this process increases the acidity within the organelle and causes the pH to drop to 4.0 and below. During CNS injury, reactive microglia exhibit various distinct rod-like and amoeboid morphologies[6] and actively engage with their environment by secreting inflammatory cytokines such as IL-1α, TNF-α, etc.[7] contributing to neuroinflammation.

Alzheimer's disease (AD) is characterized by the accumulation of amyloid-β (Aβ) plaques in the brain leading to neuroinflammation and neuronal death.[8] Aβ is a small ~4 kDa peptide that is produced upon cleavage of the amyloid precursor protein expressed on neuronal membranes by β- and γ-secretases.[9] Aβ peptides exists in several forms ranging from 36 to 42 amino acid residues, however, Aβ1-42 isoforms are the main components of the amyloid plaque deposits found in the brains of AD patients.[10] The role of microglial Aβ phagocytosis and the subsequent intracellular degradation of Aβ in AD brains is poorly understood. Receptors that directly bind to Aβ and initiate their phagocytic clearance are not well identified. Furthermore, activated microglial cells in aged mice and humans brains as well as cells surrounding Aβ plaques are observed to be functionally impaired and have reduced phagocytic function. Thus, studying Aβ-specific phagocytosis by microglia is important in elucidating the underlying mechanisms involved in Aβ-mediated pathogenesis in AD.

Current methods to study microglial phagocytosis involve the use of latex beads,[11] zymosan particles,[12] and E. coli particles[13] conjugated with fluorophores such as fluorescein and rhodamine.[14] pH-sensitive dyes are also available such as pHrodo™ E. coli and zymosan bioparticles. However, using the currently available pHrodo™ dye-conjugates do not confer the Aβ-specificity to microglia that are essential for identifying mechanisms specific to Aβ clearance in AD. Studying microglial phagocytosis in an AD-specific context requires the use of Aβ peptides. Fluorophore conjugates of Aβ have been used to evaluate Aβ-specific microglial phagocytosis[11,15] but have several disadvantages with respect to live-cell imaging and sorting of cells that have internalized Aβ compared to the peptides just sticking on the cell surfaces. First, fluorophore-conjugated Aβ peptides exhibit sustained fluorescence throughout the cell culture medium and contribute to a noisy background thereby hindering the clear visualization of the live phagocytic cells. Second, in live-cell imaging and in fluorescence-activated cell sorting (FACS) of live cells, it is difficult to differentiate between Aβ that are internalized by the microglia and Aβ that are just stuck to the cell surface. Third, with the above drawbacks, monitoring the microglial phagocytosis of fluorophore-conjugated Aβ in real time presents challenges in differentiating between the phagocytic ("functional") and non-phagocytic ("dysfunctional") microglial cells.

To address these issues, we have developed a pH-dependent fluorescent conjugate of human Aβ1-42, hAβ$^{pH}$, (and a pH-dependent fluorescent conjugate of recombinant Aβ(M1-42), rec-Aβ$^{pH}$) that are non-fluorescent outside the cells at the physiological pH of 7.4 and fluoresce brightly when they are phagocytosed into the acidic intracellular phagosomes. The hAβ$^{pH}$ conjugate was synthesized by linking the human Aβ1-42 peptide or recombinant Aβ(M1-42) to the amine-reactive Protonex Green 500, SE (PTXG) fluorophore (FIG. 1A). There are a few commercially available pH-sensitive fluorophores out of which PTXG was selected based on its ability to emit intense fluorescence at the specific acidic-pH range. The N-terminal (D1) as well as side chain amine groups of Lysine residues (K16 and K28) of human Aβ1-42 peptide were utilized for the conjugation. The conjugated hAβ$^{pH}$ product (molecular weight >4.5K) was separated from small molecular weight fragments by using protein concentrator [3000 Molecular Weight Cut-Off (MWCO] and the conjugated product was confirmed with MALDI-MS. The MALDI-MS spectra clearly demonstrated the PTXG conjugation with the Aβ1-42 peptide with a removal of the succinimidyl ester (SE) as a leaving group. The ATR-FTIR spectrum of Aβ1-42 peptide exhibits a strong absorption peak at 1625 cm$^{-1}$. The ATR-FTIR spectrum of PTXG shows the presence of amide and ester group with absorption peaks at 1755 and 1727 cm$^{-1}$. The conjugated product hAβ$^{pH}$ shows a distinct amide peak at 1674 cm$^{-1}$. In addition, $^1$H-NMR of hAβ$^{pH}$ indicates the presence of PTXG as well as Aβ1-42 peptide. These experiments collectively suggest the formation of the hAβ$^{pH}$ conjugate. We have also synthesized a conjugate of the Aβ1-42 peptide with pHrodo-Red™ (RODO) and confirmed the conjugate formation from MALDI-MS spectrum (m/z 6104.95 and 5574.42).

Figure 1B:
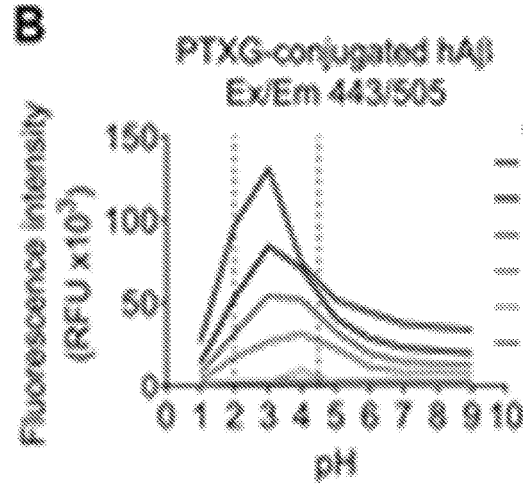
FIG. 1B and FIG. 1C show fluorescence spectra of PTXG and RODO-conjugated hAβ$^{pH}$.
Figure 1C:
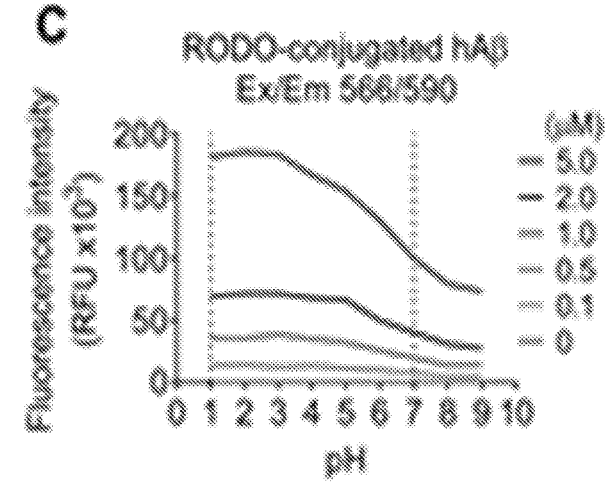
Figure 2A:
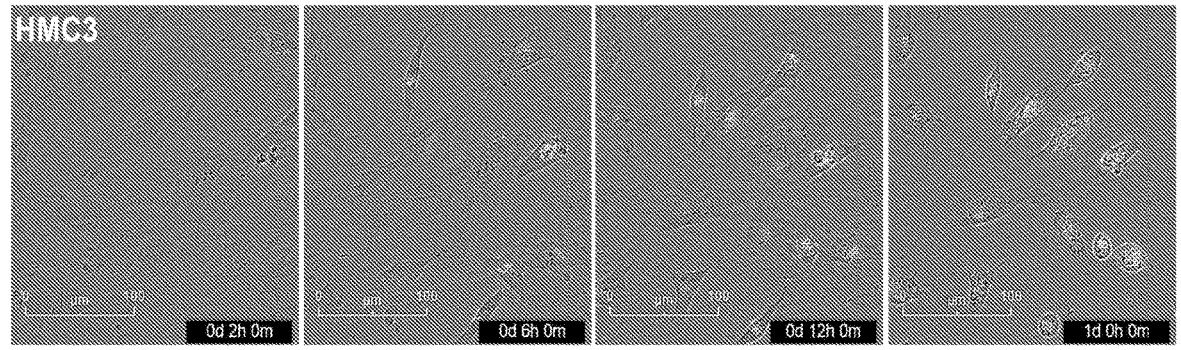
FIGS. 2A-2C show live-cell imaging of hAβ$^{pH}$ (5 μM) phagocytosis by HMC3 (FIG. 2A), N9 (FIG. 2B), and BV2 (FIG. 2C) cells.
Figure 2B:
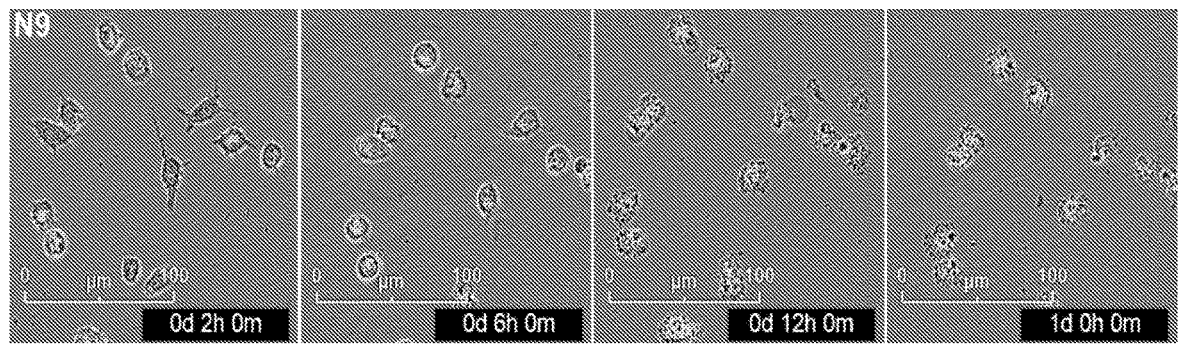
Figure 2C:
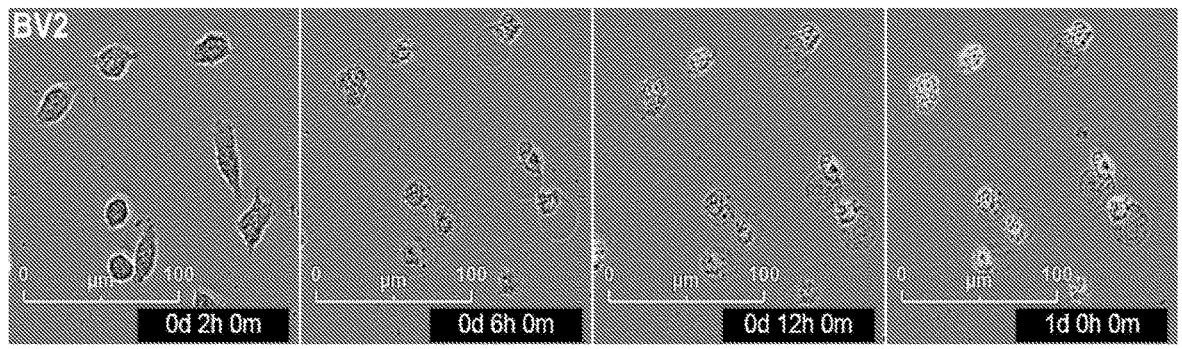

The pH-sensitivity of our PTXG and RODO-conjugated hAβ$^{pH}$ were confirmed by measuring their fluorescence intensities from pH 1.0 to 9.0. The PTXG-conjugated hAβ$^{pH}$ showed maximum fluorescence between pH 2.2 and 4.2 at concentrations of 0.5, 1.0, 2.0, and 5.0 µM (FIG. 1B) with an excitation/emission of 443/505 nm. The PTXG-hAβ$^{pH}$ conjugates did not show an increased fluorescence intensity at the physiological pH of 7.4. At these concentrations, the PTXG-hAβ$^{pH}$ showed maximum fluorescence intensities between 500 and 510 nm in 2.0-4.0 pH range, as confirmed by the emission spectra. On the other hand, the RODO-conjugated hAβ$^{pH}$ displayed increased fluorescence between a wide pH range of 1.0-7.0 for the same concentrations (FIG. 1C). Due to the broad range of fluorescence exhibited by the RODO-hAβ$^{pH}$ conjugates, the PTXG-hAβ$^{pH}$ conjugate were chosen for all further experiments. Additionally, the ability of hAβ$^{pH}$ to aggregate similar to the non-conjugated Aβ was confirmed by Atomic Force Microscopy (AFM), thus suggesting the aggregation characteristic of hAβ$^{pH}$ to be similar to Aβ1-42.

Figure 3A:
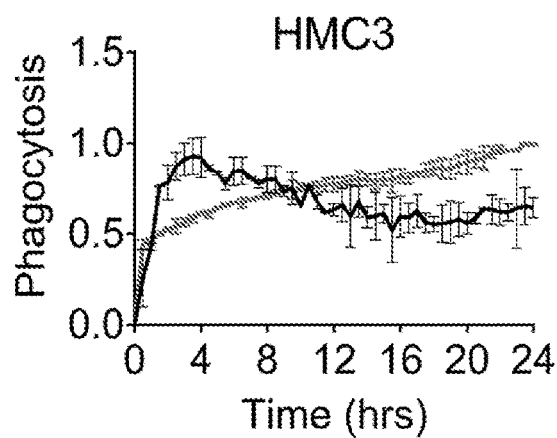
FIG. 3A. A 24 hr time-course analysis of phagocytosis of hAβ$^{pH}$ in HMC3, N9, and BV2 cells.
Figure 3A:
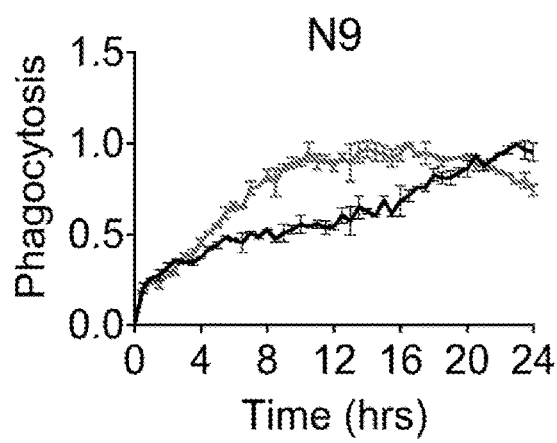
Figure 3A:
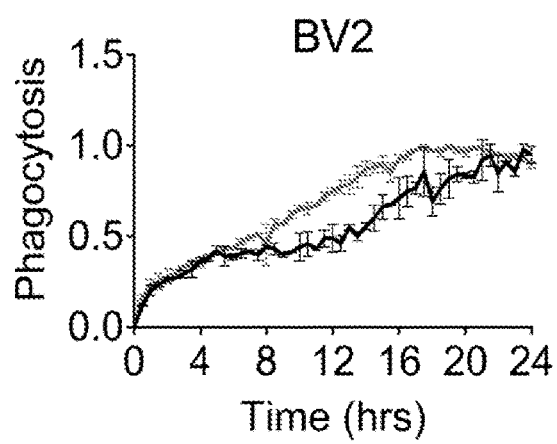
Figure 3B:
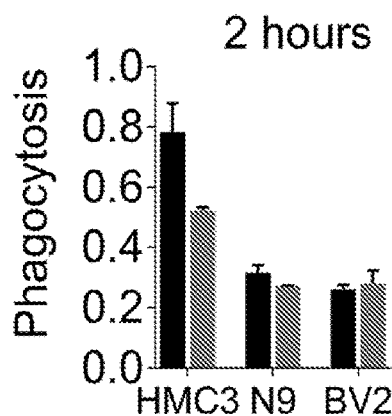
FIG. 3B. Comparison of phagocytic capacity of HMC3, N9, and BV2 cells at 2, 18, and 24 hr time points at 1.0 μM and 5.0 μM hAβ$^{pH}$.
Figure 3B:
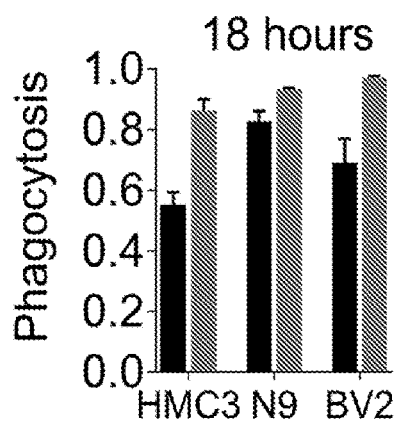
Figure 3B:
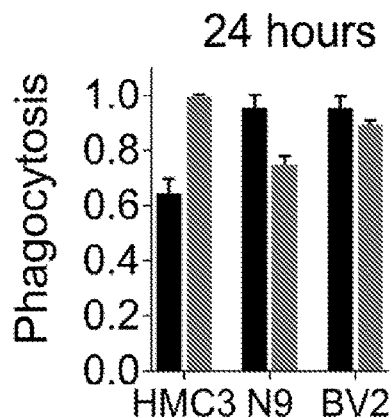

To visualize the phagocytosis of hAβ$^{pH}$ in live microglial cells, immortalized human microglial clone 3 (HMC3) cells and mouse BV2 and N9 microglial cells were treated with 0.1-5.0 µM doses of hAβ$^{pH}$ and live-cell images were acquired every 30 minutes for 24 hours on the IncuCyte™ ZOOM Live Content Imaging system (FIGS. 3A-3B). The green channel on the IncuCyte™ ZOOM system allows for excitation and emission wavelengths of 460/524 nm and thus the hAβ$^{pH}$ reporter was optimal for use on the instrument.

Mouse N9 microglial cells that phagocytosed hAβ$^{pH}$ reporter at a higher concentration of 5.0 µM showed a gradual increase in the intracellular green fluorescence over time, with peak fluorescence between 12-18 hours. Beyond 18 hours, the intracellular fluorescence began to decrease suggesting degradation of the hAβ$^{pH}$. Similarly, mouse BV2 microglial cells displayed increased intracellular fluorescence at the 5.0 µM dose during the 18-hour time period followed by a plateau in fluorescence beyond 20 hours. Both N9 and BV2 cells exhibited a gradual increase in intracellular fluorescence, relating to phagocytosis, at 1.0 and 2.0 µM doses of hAβ$^{pH}$. Cells that did not phagocytose hAβ$^{pH}$ did not display any fluorescence thereby differentiating hAβ$^{pH}$-specific phagocytic and non-phagocytic microglial cells in real time. The trend in phagocytosis, however, was opposite in human microglial cells (FIG. 3). HMC3 cells displayed increased phagocytosis at 5.0 µM concentration. At 1.0 and 2.0 µM doses of hAβ$^{pH}$, HMC3 cells displayed increased intracellular fluorescence between 1-8 hours followed by gradual decrease in the fluorescence intensity thereby suggesting increased initial uptake of hAβ$^{pH}$ followed by quick intracellular degradation of hAβ$^{pH}$.

The phagocytic functional differences between mouse and human microglial cells is not surprising due to the genomic and transcriptomic differences between the mouse and human microglial cells that have been highlighted in recent studies.[16] With live-cell imaging, the morphological differences of the phagocytic microglial cells were also apparent. Over the initial 2 hours, many cells displayed an elongated, branched morphology followed by an amoeboid morphology during consequent time points. Utilizing hAβ$^{pH}$ in live-cells allowed us to visualize interesting biological functions of the hAβ$^{pH}$-activated cells in real time. For example, an HMC3 cell upon phagocytosis of hAβ$^{pH}$, initiated contact with neighboring cell followed by engulfing the neighboring cell and eventually releasing debris upon degradation. Thus, our hAβ$^{pH}$ reporter can be used to analyze hAβ$^{pH}$-specific phagocytosis and can be used in experiments to evaluate the enhancement or inhibition of microglial phagocytosis for the in vitro screening of various small molecules for AD.

Figure 4A:
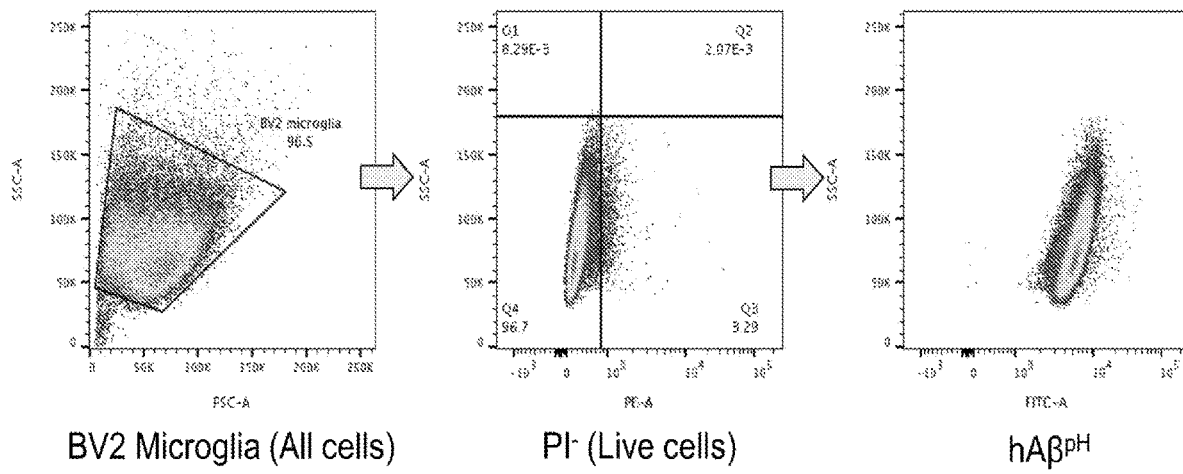
FIG. 4A shows the flow cytometry analysis of live BV2 microglia indicating phagocytosis of hAβ$^{pH}$ at 2 hrs.
Figure 4B:
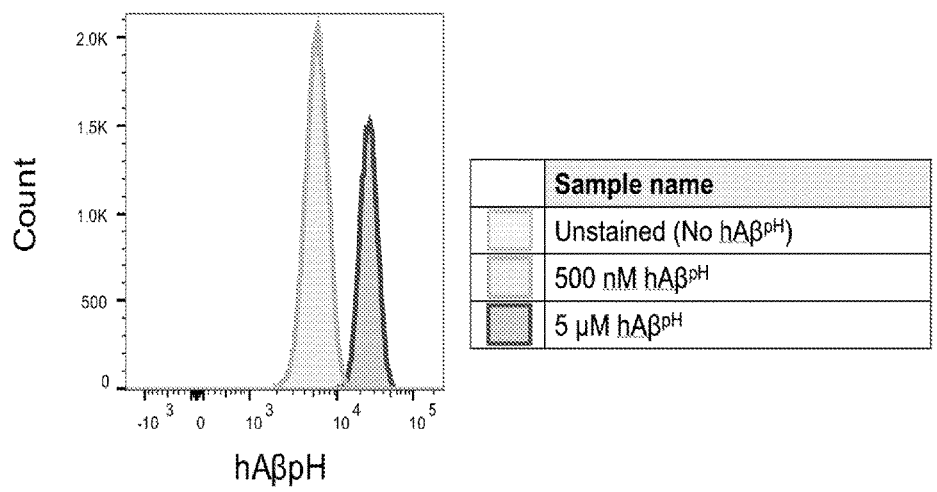
FIG. 4B shows that the cells treated with 5 μM hAβ$^{pH}$ (dark green, right) displays a greater fluorescence indicating greater phagocytosis compared to cells treated with 500 nM hAβ$^{pH}$ (pale green, left).

Flow cytometry and cell sorting are powerful tools to characterize the functional diversity of microglia in disease and physiologically relevant states. Indeed, we show that live microglial cells that phagocytose hAβ$^{pH}$ can be analyzed using flow cytometry without the need of antibodies to detect Aβ. Dose-dependent phagocytosis of hAβ$^{pH}$ was evident from the shift in the fluorescence peak between the 0.5 µM and 5.0 µM hAβ$^{pH}$ (FIG. 4). Green fluorescence is exhibited only upon internalization of hAβ$^{pH}$ and not when the peptides are stuck on the cell surface allowing for flow cytometry analysis of microglial hAβ$^{pH}$ phagocytosis. This confirms the sensitivity of the probe and the use of hAβ$^{pH}$ in robust single cell analysis.

Figure 5:
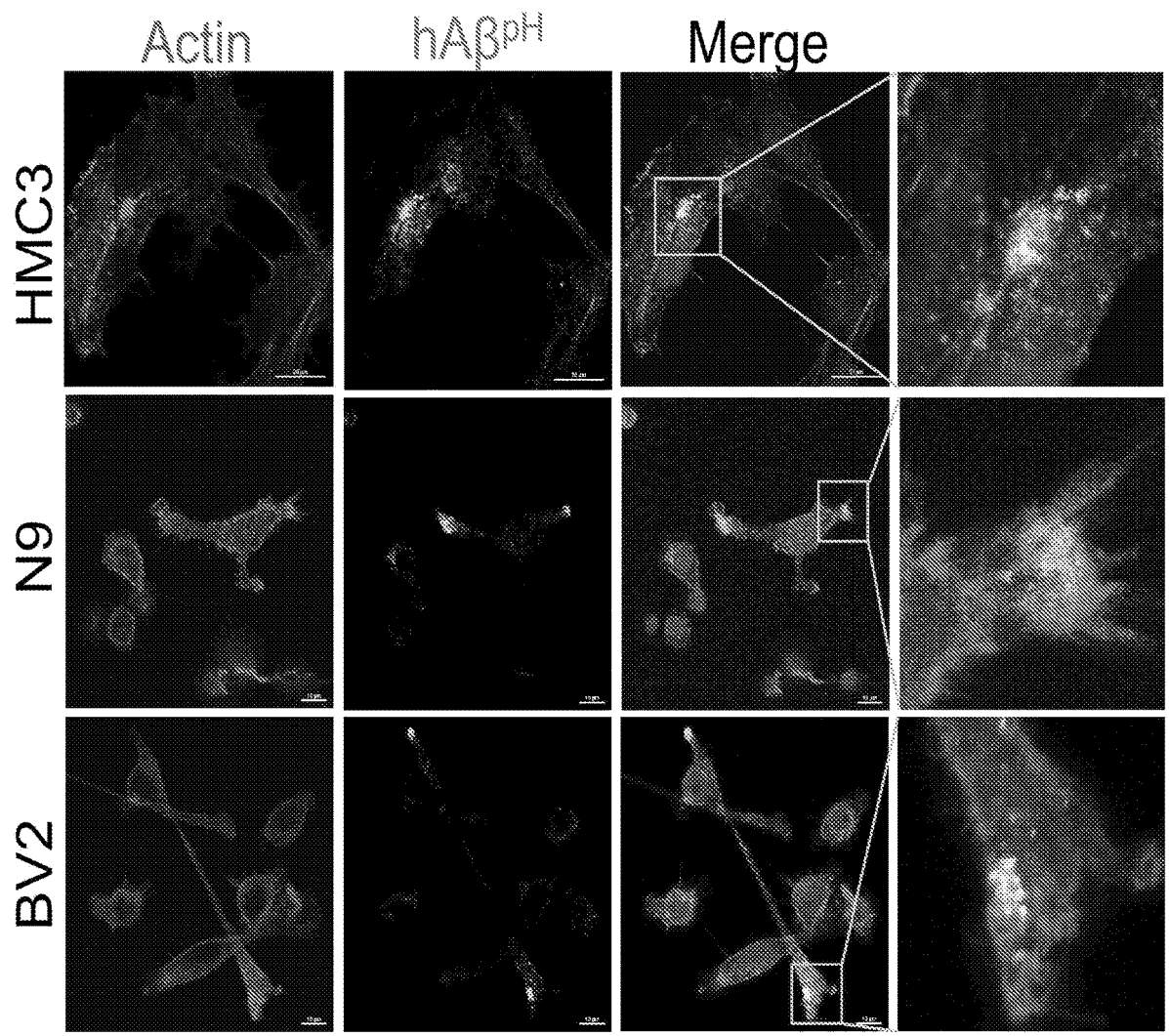
FIG. 5 shows confocal imaging results of fixed cells retains the fluorescence of hAβ$^{pH}$ within the HMC3, N9, and BV2 cells. Scale bar shown is 50 μm.

Fixation of cells and using target protein markers along with hAβ$^{pH}$ can inform us about the molecular mechanisms involved in microglial phagocytosis with confocal microscopy. To confirm that the hAβ$^{pH}$ reporter can maintain its fluorescence in fixed cells, HMC3, BV2, and N9 microglial cells were fixed with common cell staining reagents. The cells were treated with 5.0 µM of hAβ$^{pH}$ for 2 hours and fixed with 4% paraformaldehyde followed by the addition of the phalloidin dye to visualize cellular integrity via the staining of the F-actin filaments (FIG. 5). Confocal imaging of the fixed hAβ$^{pH}$-treated cells showed green fluorescence along with the red actin filaments, therefore, confirming the intake of hAβ$^{pH}$ peptides by the microglia into their cytoplasm.

Figure 6:
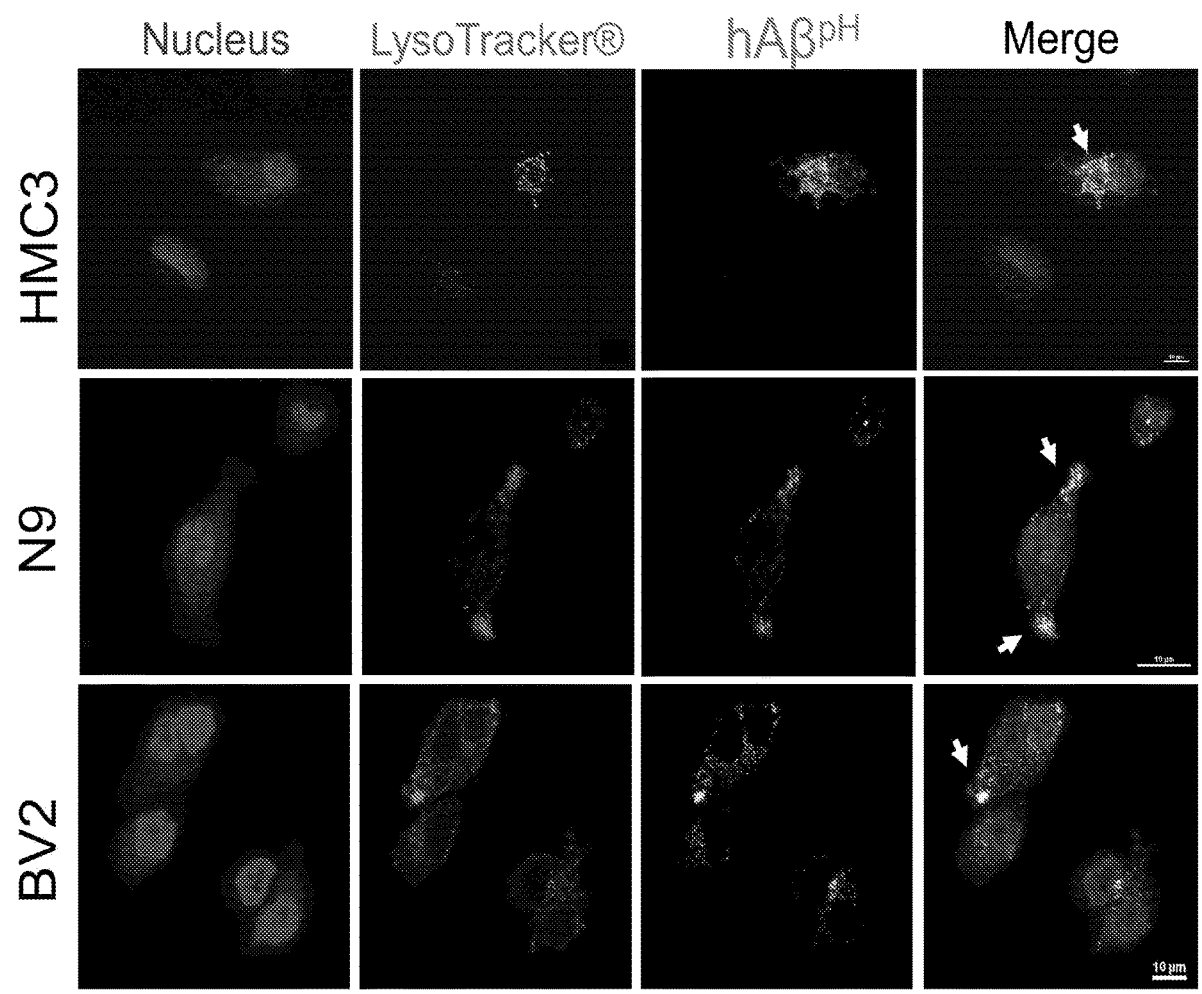
FIG. 6 shows confocal imaging results of fixed cells confirms the localization of the hAβ$^{pH}$ within the intracellular acidic organelles of HMC3, N9, and BV2 cells. Scale bar shown is 10 μm.

To visualize the localization of the hAβ$^{pH}$ within the microglial cell cytoplasm, the acidic intracellular compartments were labeled with LysoTracker™ DND-99 that stains the lysosomal organelles of the cells. The co-localization of green fluorescent hAβ$^{pH}$ along with the red signal from the LysoTracker™ dye confirmed the presence of hAβ$^{pH}$ within the acidic phagosomes at the 2-hour time point (FIG. 6). It has been recently shown that microglia in vitro recognize and phagocytose Aβ peptides through scavenger receptors,[8] Toll-Like Receptor 2 (TLR2),[17] Cluster of Differentiation 14 (CD14),[18] and Triggering Receptors Expressed on Myeloid Cells 2 (TREM2).[19] Thus, our hAβ$^{pH}$ reporter serves as a valuable chemical tool in delineating the role of several receptor proteins involved in the Aβ uptake of live and fixed microglial cells using cell staining reagents and by using specific antibodies such as anti-CD14, anti-TREM2, etc. Additionally, the role of inflammation, including the effects of inflammatory cytokines, such as IL-1a and TNF-α, on Aβ clearance is not resolved. Thus, our hAβ$^{pH}$ will be a valuable for studying hAβ$^{pH}$ phagocytosis under the influence of inflammatory cytokines or small molecule inhibitors.

Figure 7:
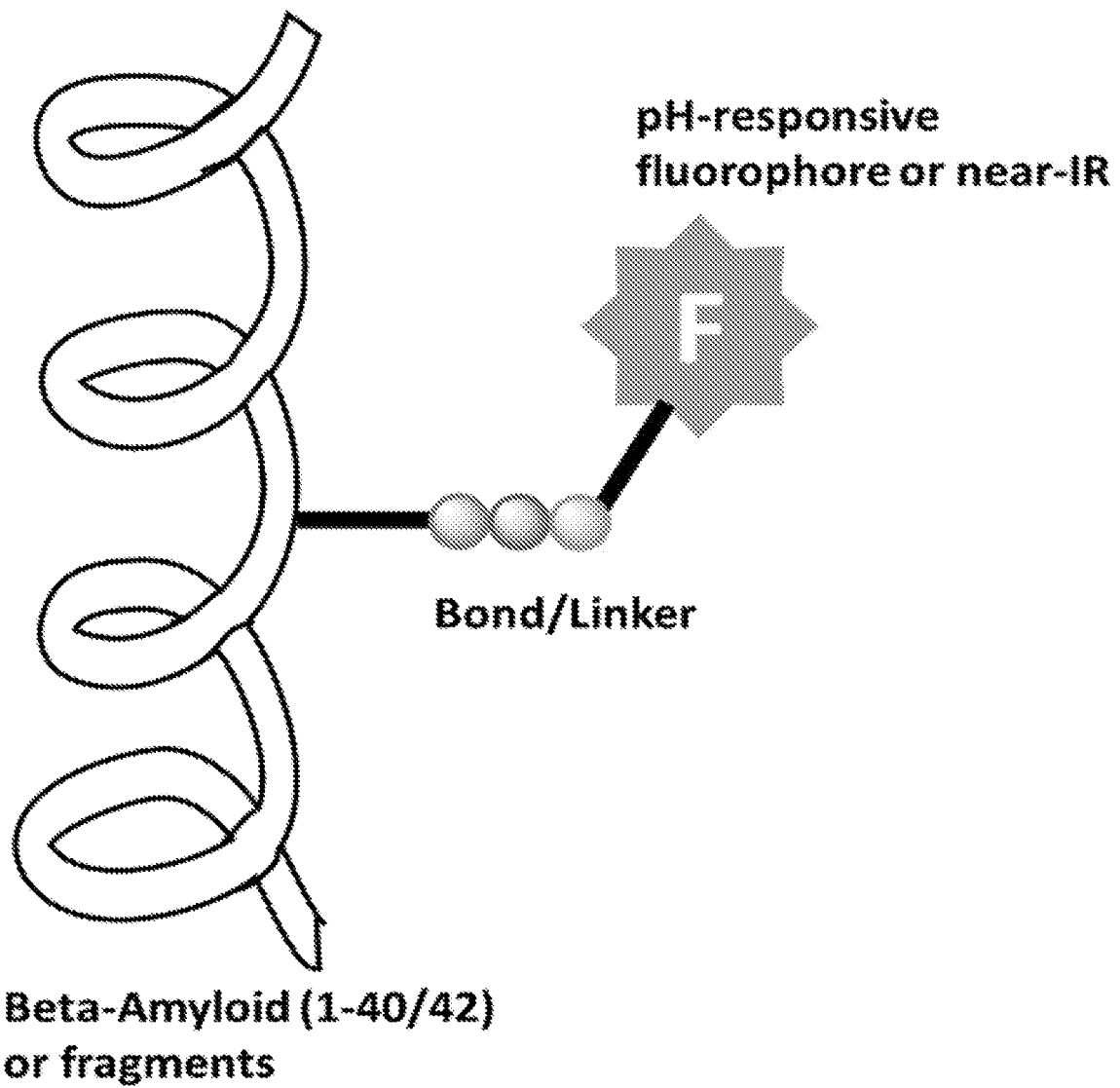
FIG. 7 is a schematic representation of the pH-dependent composition matters useful for study and diagnosis of Alzheimer's disease.

As illustrated, FIG. 7 is a schematic representation of the pH-dependent composition matters useful for diagnosis and/or treatment of Alzheimer's disease, wherein F is a pH-response fluorophore, dye, or a therapeutic agent.

Figure 8A:
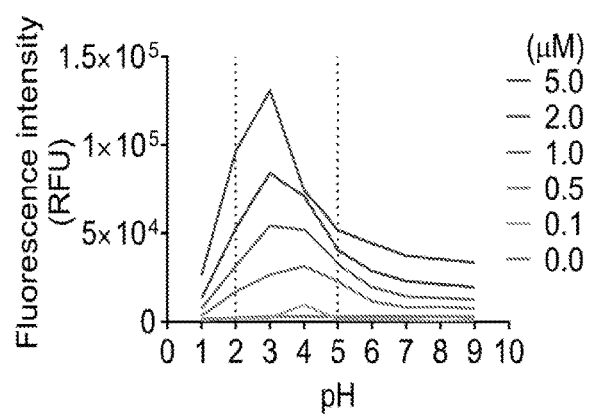
FIGS. 8A-8F show synthesis and characterization of Aβ$^{pH}$.
Figures 8B, 8C:
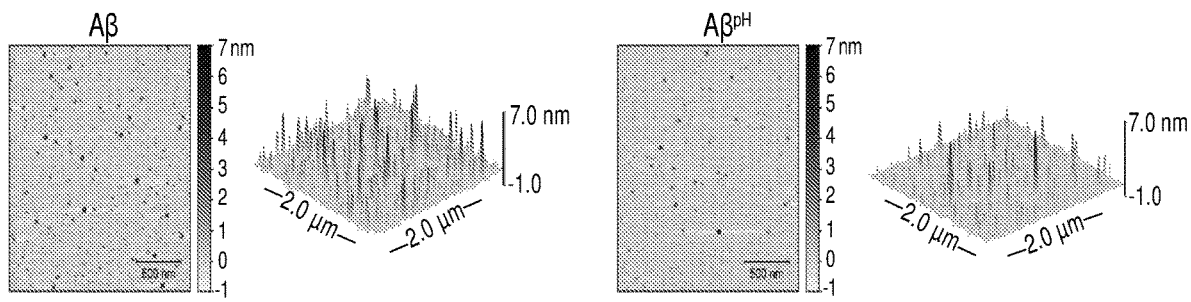
Figure 8D:
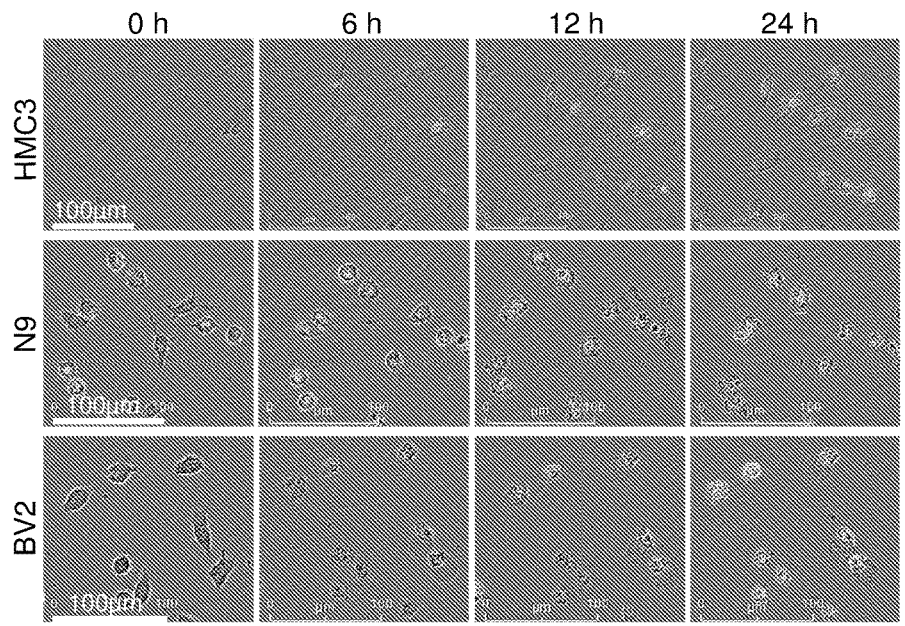
Figure 8E:
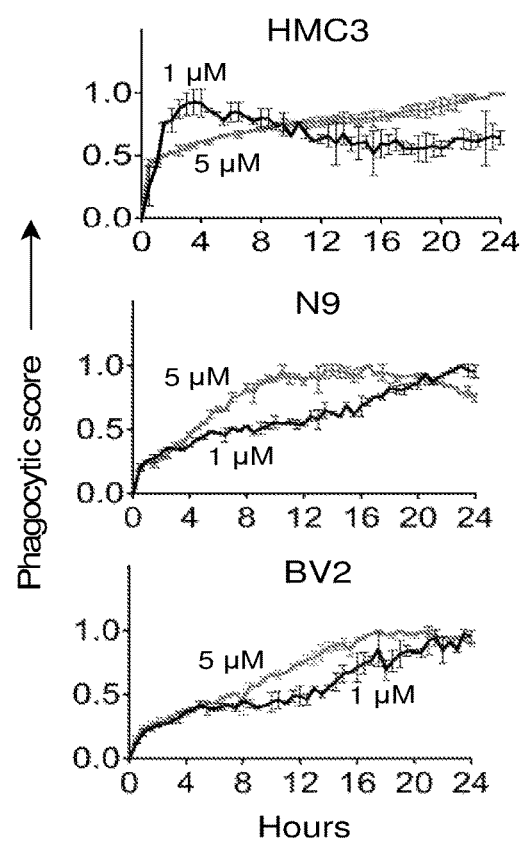
Figure 8F:
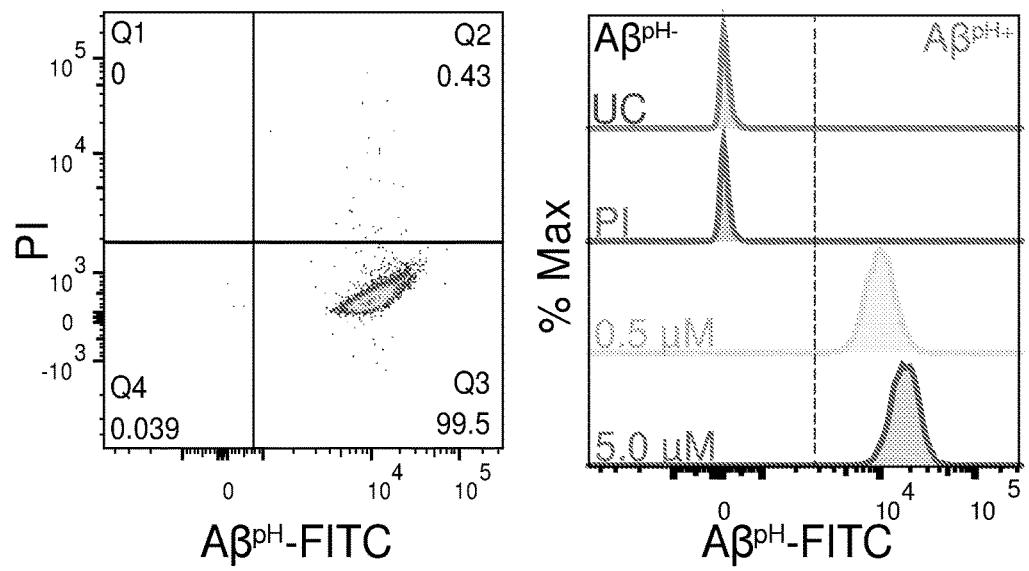

FIGS. 8A-8F show synthesis and characterization of Aβ$^{pH}$. FIG. 8A demonstrates the pH-sensitivity of the Aβ$^{pH}$ probe characterized at different concentrations from 0.1 µM to 5.0 µM. Increased fluorescence is observed within the narrow range of pH 2.0 to 5.0. FIG. 8B shows the Atomic Force Microscopy topographic images of common synthetic Aβ oligomers. Left-2D topographic image of synthetic Aβ oligomers. Right-3D image (2×2 μm x-y). FIG. 8C shows the Atomic Force Microscopy topographic images of $A\beta^{pH}$ oligomers. Left-2D topographic image of $A\beta^{pH}$. Right-3D image (2×2 μm x-y). FIG. 8D shows the live cell imaging of the phagocytic uptake of 1 μM $A\beta^{pH}$ by BV2 and N9 mouse microglia and by HMC3 human microglia over 24 h. FIG. 8E shows the quantification of $A\beta^{pH}$ phagocytic score by BV2, N9, and HMC3 microglial cells from the live cell images. FIG. 8F shows the phagocytic uptake of $A\beta^{pH}$ by BV2 cells is measured and quantified via flow cytometry analysis. Dot plot shows live (PI⁻) and $A\beta^{pH+}$ cells. No green fluorescence is measured in unstained cells (UC) and in cells stained with the PI live/dead stain only whereas green fluorescence is measured in cells treated with 0.5 and 1.0 μM $A\beta^{pH}$ for 1 hour. Data shown in terms of % max, by scaling each curve to mode=100% (y-axis).

Figure 9A:
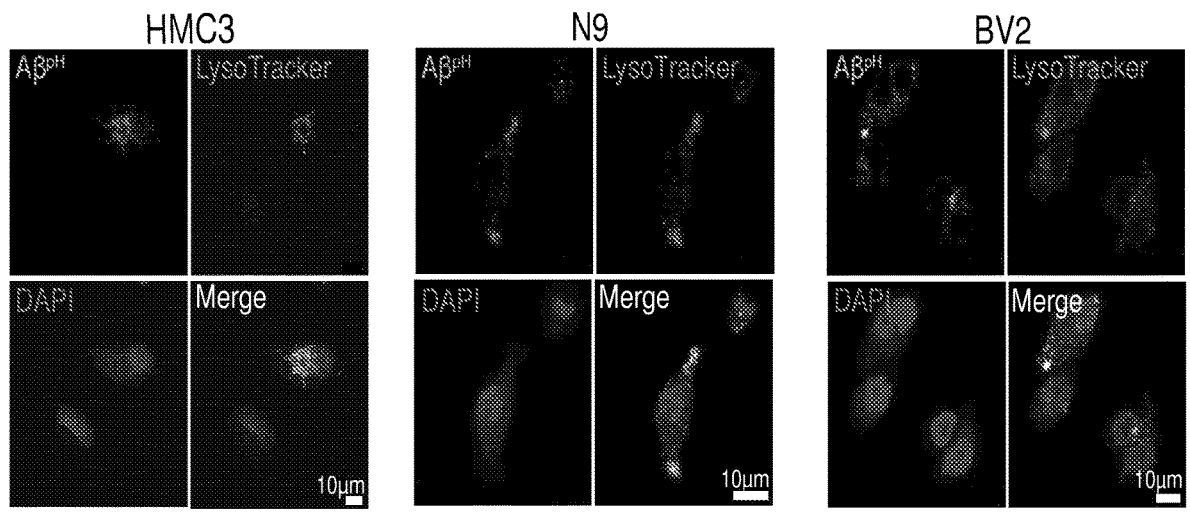
Figure 9B:
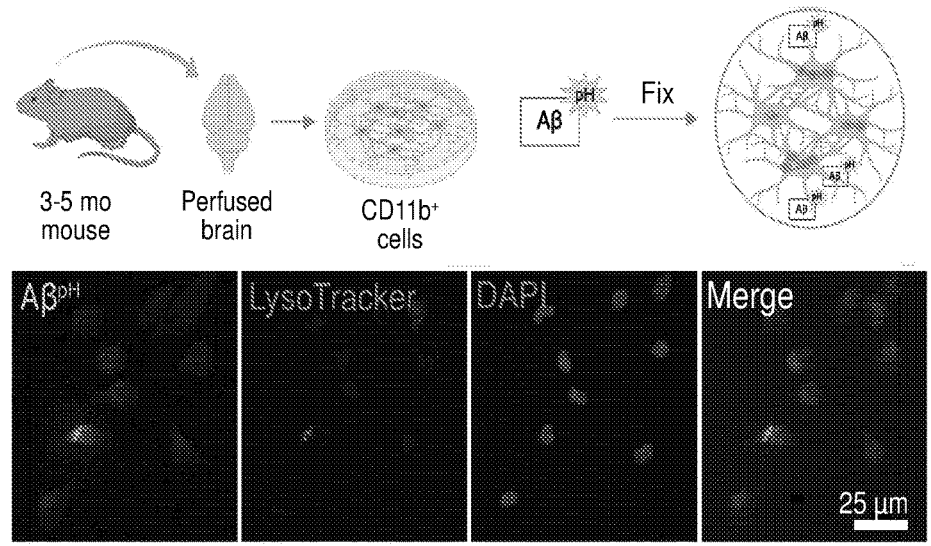
Figure 9C:
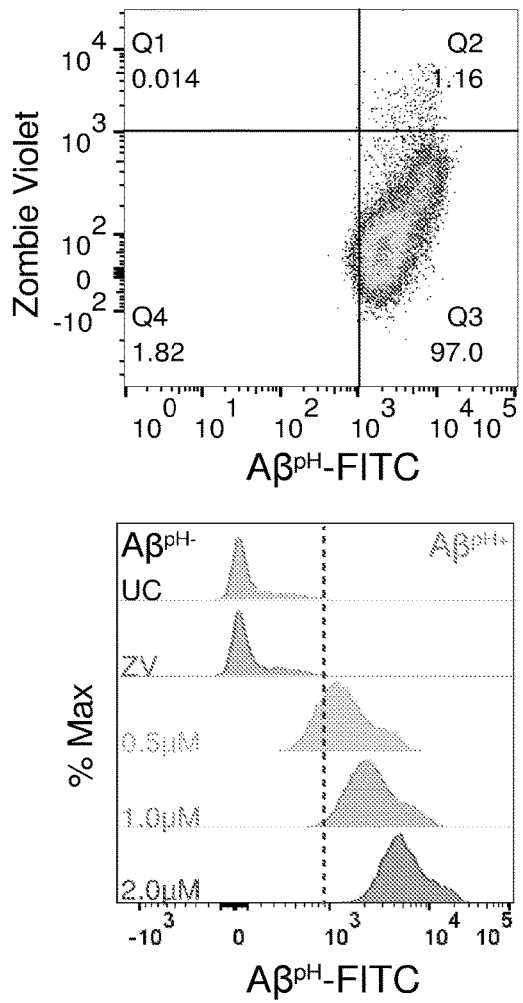

FIGS. 9A-9F demonstrated that Fluorescence of internalized $A\beta^{pH}$ is retained in fixed cells. FIG. 9A shows the confocal images of fixed HMC3, N9, and BV2 cells showing the uptake of $A\beta^{pH}$ (green). Cells are stained for acidic intracellular organelles (LysoTracker Red, confirming colocalization of the $A\beta^{pH}$ within the acidic intracellular organelles) and nuclei (DAPI, blue). No antibody is required to detect Aβ. FIG. 9B shows primary mouse microglia grown in defined, reduced-serum media phagocytose $A\beta^{pH}$ ex vivo. Cells are fixed and stained for nuclei and show $A\beta^{pH}$ colocalized in the acidic organelles with LysoTracker Red. FIG. 9C demonstrates the phagocytic uptake of $A\beta^{pH}$ by primary microglia is measured and quantified via flow cytometry analysis. Dot plot shows live (ZV⁻) and $A\beta^{pH+}$ cells. No green fluorescence is measured in unstained cells (UC) and cells stained with the ZV live/dead stain only whereas green fluorescence is measured in cells treated with 0.5, 1.0, and 2.0 μM $A\beta^{pH}$ for 1 hour. Data shown in terms of % max, by scaling each curve to mode=100% (y-axis). FIG. 9D demonstrates the primary immunopanned rat astrocytes also phagocytose $A\beta^{pH}$ in serum-free conditions. Cells are fixed and stained for astrocyte specific GFAP antibody (red) and nuclei. FIG. 9E shows uptake of $A\beta^{pH}$ over time by primary immunopanned astrocytes as observed in live cells in real time. FIG. 9F demonstrates the quantification of uptake of 0.5, 1.0, and 2.0 μM $A\beta^{pH}$ by primary astrocytes.

Figure 10A:
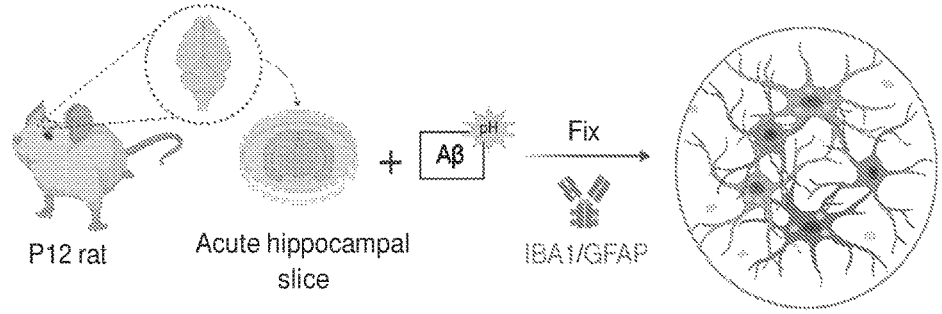
FIGS. 10A-10D demonstrate that Aβ$^{pH}$ is phagocytosed by both microglia and astrocytes in situ in rat hippocampal tissue sections.
Figure 10B:
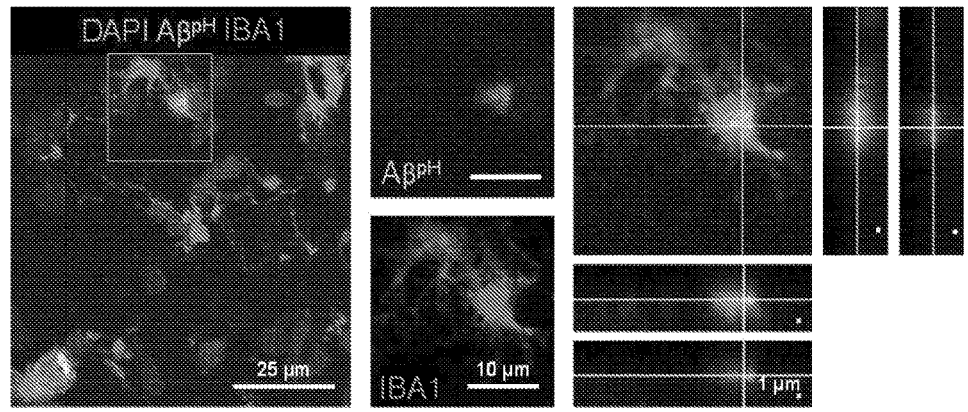
Figure 10C:
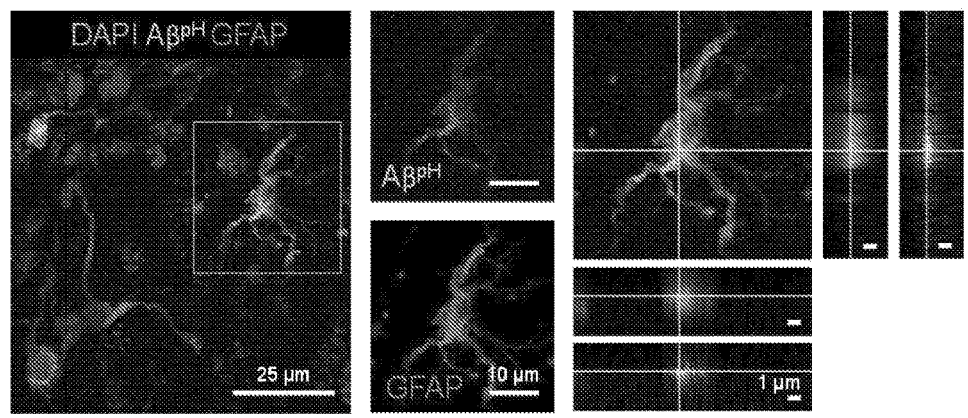
Figure 10D:
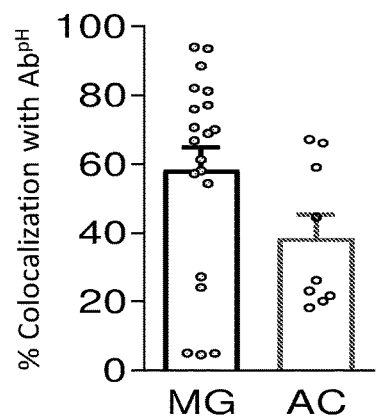

FIGS. 10A-10D demonstrate that $A\beta^{pH}$ is phagocytosed by both microglia and astrocytes in situ in rat hippocampal tissue sections. FIG. 10A shows the schematic of phagocytosis assay in rat hippocampal tissue slices. FIG. 10B shows the quantification of $A\beta^{pH}$ colocalized with microglia and astrocytes, as defined by IBA1+ and GFAP⁺ staining, respectively. Data shown as mean±s.e.m. collected from 20 and 8 slices for microglia and astrocytes respectively. FIG. 10C shows representative 2D maximum projection of a confocal z-stack showing microglia phagocytosing $A\beta^{pH}$. Closeup of the indicated cell (yellow square) is shown on the right. Orthogonal projections at the level of the crosshairs show internalization of $A\beta^{pH}$ within the microglia. FIG. 10D shows representative 2D maximum projection of a confocal z-stack showing astrocytes phagocytosing $A\beta^{pH}$. Closeup of the indicated cell (yellow square) is shown on the right. Orthogonal projections at the level of the crosshairs show internalization of $A\beta^{pH}$ within the astrocyte.

Figure 11A:
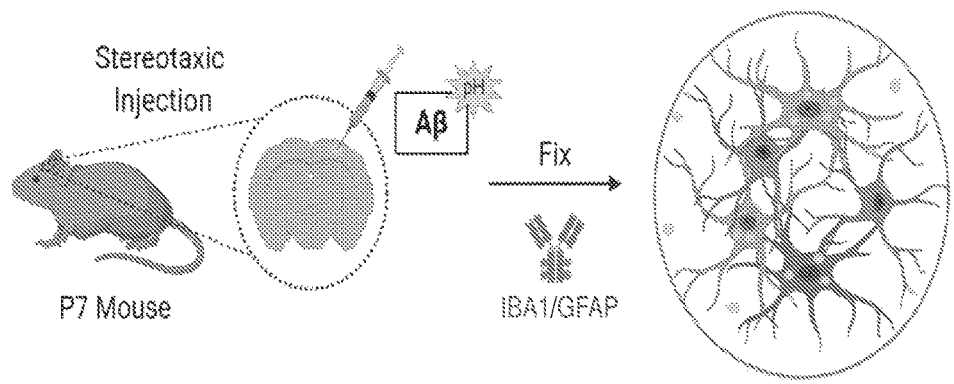
FIGS. 11A-11G show that Aβ$^{pH}$ is phagocytosed by cortical microglia and astrocytes in vivo and by rat retinal astrocytes in vivo.
Figure 11B:
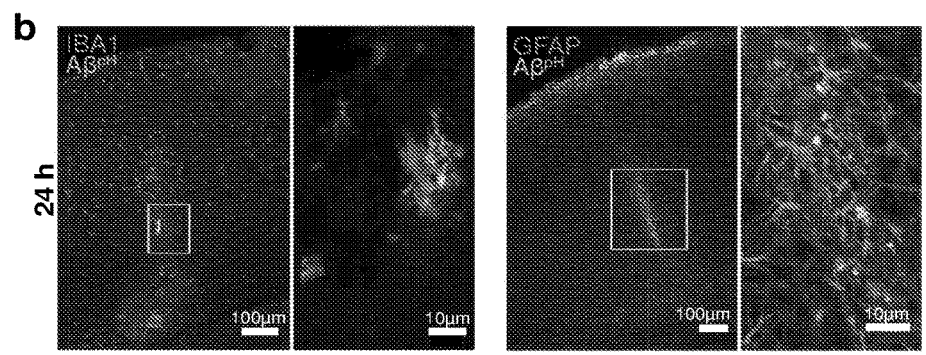
Figure 11C:
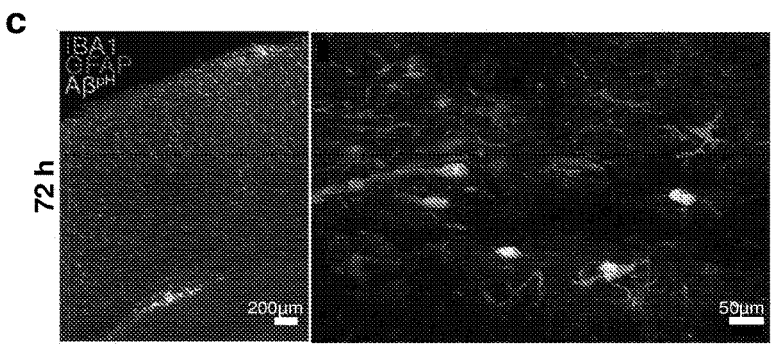
Figure 11D:
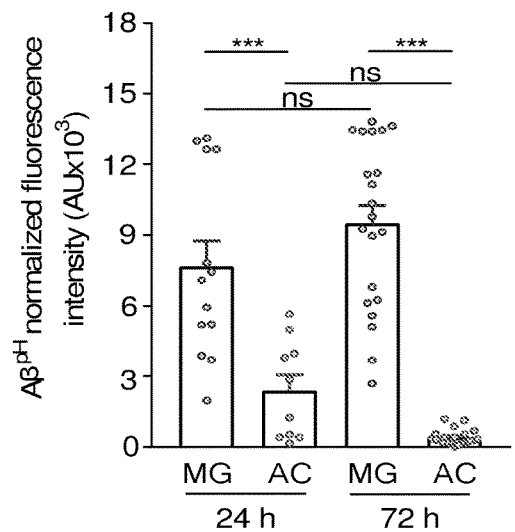
Figure 11E:
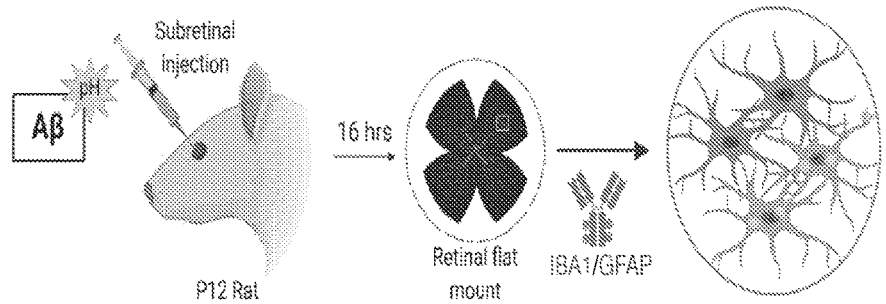
Figure 11F:
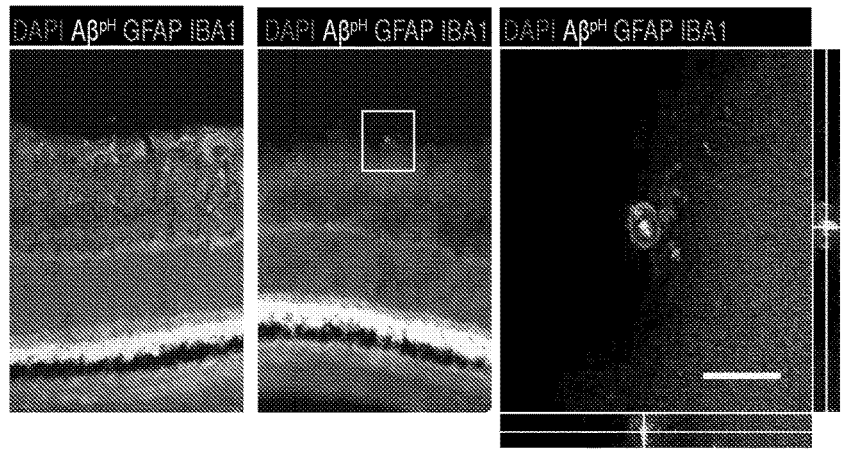
Figure 11G:
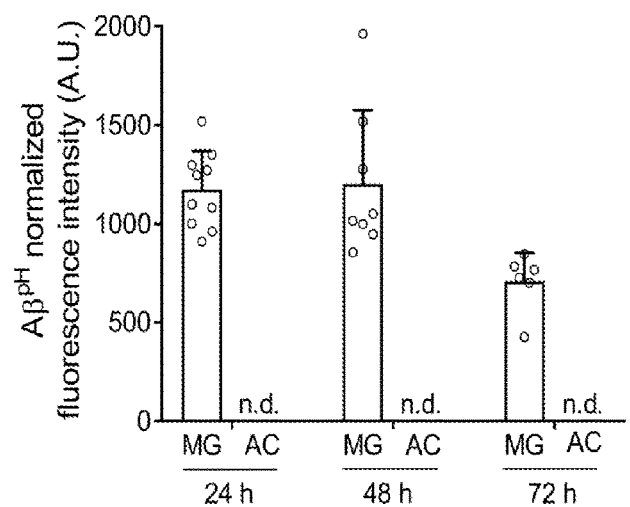

FIGS. 11A-11G show that $A\beta^{pH}$ is phagocytosed by cortical microglia and astrocytes in vivo and by rat retinal astrocytes in vivo. FIG. 11A demonstrates the schematic of stereotaxic microinjection of $A\beta^{pH}$ in the somatosensory cortex of P7 mouse followed by staining of fixed tissue section after 24 and 72 hours. FIG. 11B demonstrates the phagocytic uptake of $A\beta^{pH}$ by IBA1⁺ microglia and GFAP⁺ astrocytes in the periventricular white matter at the 24 h timepoint. FIG. 11C demonstrates the IBA1⁺ microglia show bright green fluorescence at 72 h in the same region indicating presence of $A\beta^{pH}$ within the cells at this timepoint. GFAP⁺ astrocytes do not show any green fluorescence in this region at this timepoint suggesting either degradation of the peptide or insufficient $A\beta^{pH}$ concentration for detectable phagocytic uptake by these cells. FIG. 11D demonstrates the quantification of $A\beta^{pH}$ fluorescence within microglia and astrocytes located in the pia and white matter regions show more $A\beta^H$ uptake by microglia compared to astrocytes. FIG. 11E demonstrates the schematic of subretinal injection of $A\beta^{pH}$ to evaluate its in vivo uptake by retinal microglia and astrocytes. FIG. 11F demonstrates the GFAP⁺ rat retinal astrocytes phagocytose $A\beta^{pH}$ in vivo. FIG. 11G demonstrates the quantification of $A\beta^{pH}$ uptake retinal IBA1⁺ microglia and GFAP⁺ astrocytes. No fluorescence was detected in astrocytes at these 3 time points (n.d.). Data shown as mean±s.d. from 2 animals.

Figure 12A:
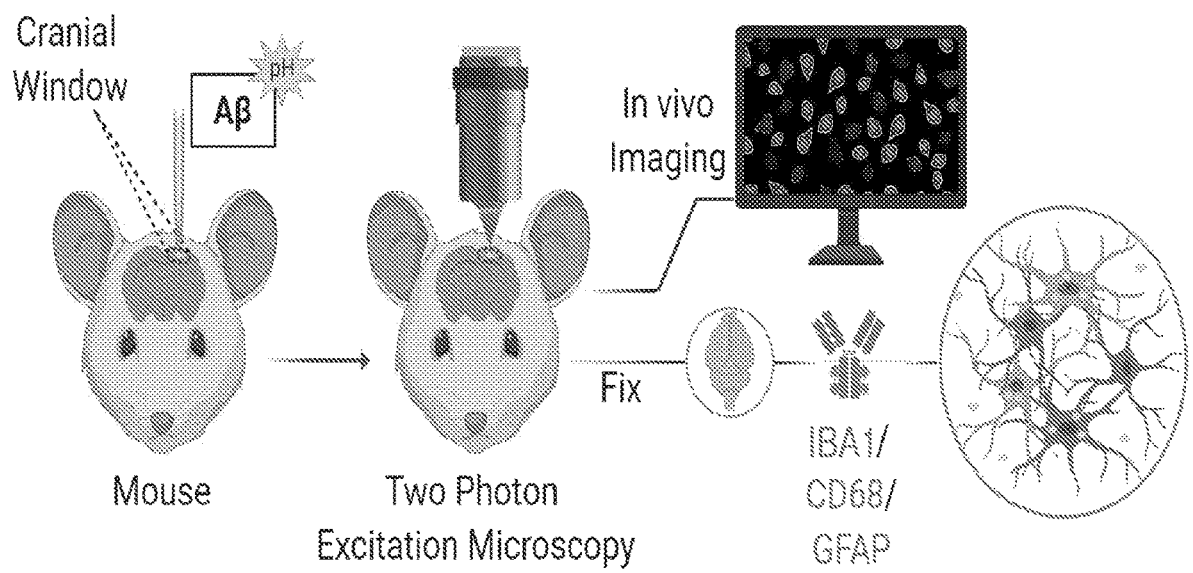
FIGS. 12A-12E show that Aβ$^{pH}$ is phagocytosed by microglia and astrocytes in vivo in the cerebral cortex.
Figure 12B:
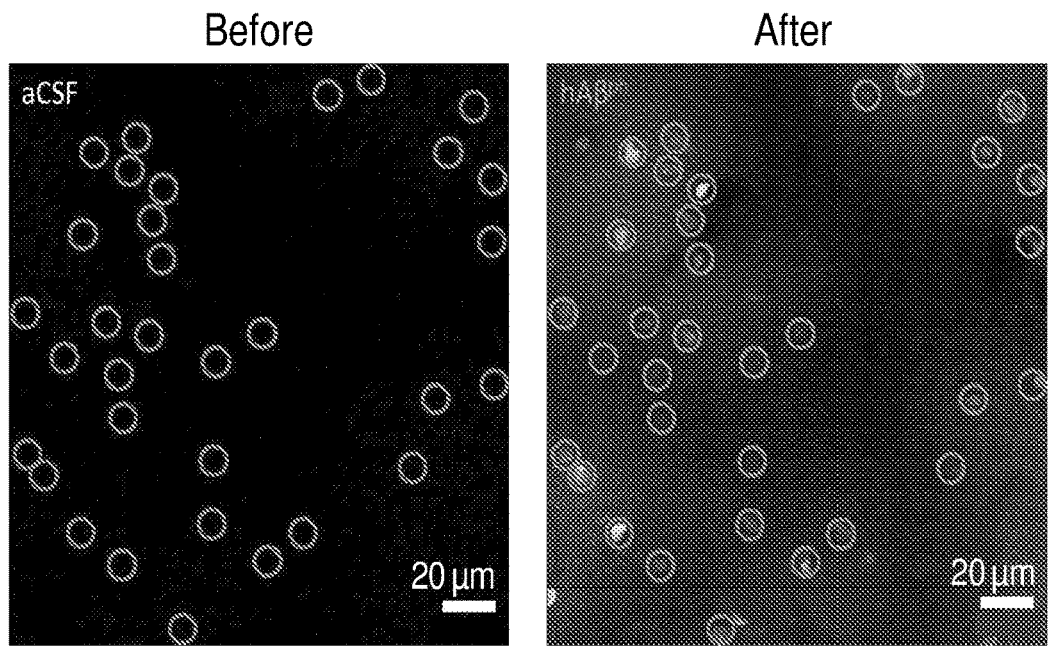
Figure 12C:
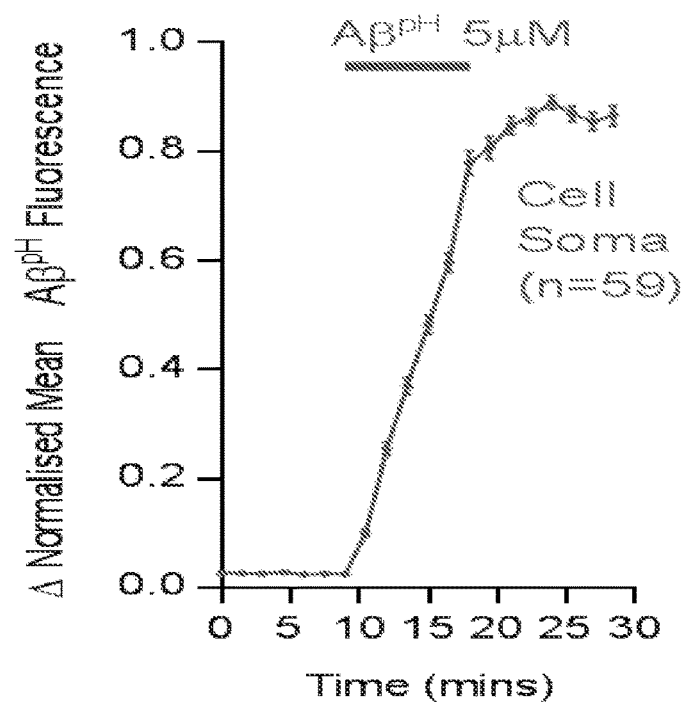
Figure 12D:
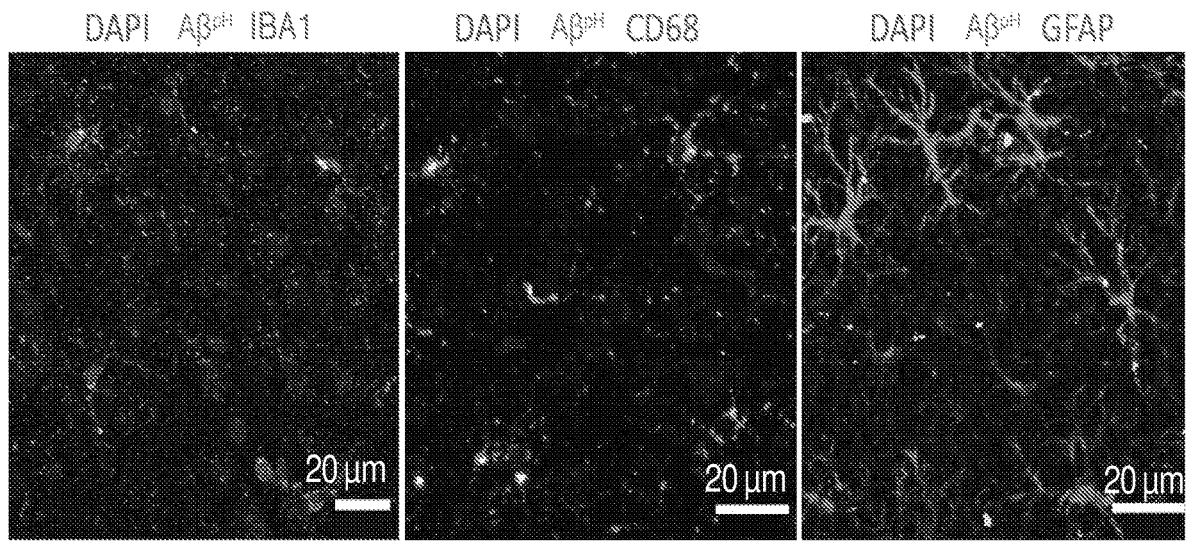
Figure 12E:
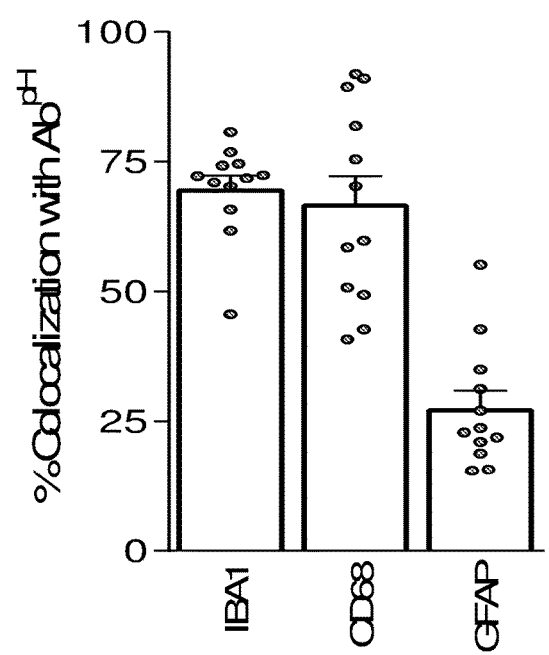

FIGS. 12A-12E show that $A\beta^{pH}$ is phagocytosed by microglia and astrocytes in vivo in the cerebral cortex. FIG. 12A shows schematic of how Aβ pH phagocytic uptake is imaged through a cranial window in vivo in real time using two photon excitation microscopy. FIG. 12B demonstrates the in vivo two-photon imaging of the mouse barrel cortex before and after topical application of $A\beta^{pH}$. The fluorescence increases in cell somata (indicated by red circles) reflecting $A\beta^{pH}$ uptake. FIG. 12C shows the quantification of mean $A\beta^{pH}$ fluorescence in cell somata over time. The data were normalized to the maximum mean $A\beta^{pH}$ fluorescence for each cell and then averaged. Data shown as mean±s.e.m. N=59 somata from 2 animals. FIG. 12D shows that, 1.5 to 3 hours after in vivo two-photon imaging of $A\beta^{pH}$, animals were perfusion-fixed and cortical slices were stained for microglia, microglia lysosomes/endosomes and astrocytes using IBA1, CD68, and GFAP antibodies, respectively. FIG. 12E shows quantification of $A\beta^{pH}$ colocalization with IBA1, CD68, and GFAP suggests that most $A\beta^{pH}$ is taken up by microglia and astrocytes in vivo. Data shown as mean±s.e.m. N=12 stacks from 3 animals.

In conclusion, our $hA\beta^{pH}$ reporter is used to visualize and analyze Aβ-specific phagocytosis in live microglial cells. Whether the Aβ-activated microglia in AD are protective, detrimental, or both remains unknown and the instant disclosure may provide an important method to find an answer. Recent evidence has suggested a highly heterogeneous population of resident-myeloid cells in the brain.[6,20,21] The functional diversity of microglial phagocytosis can be utilized for developing specialized targeted therapeutics for AD. Using $hA\beta^{pH}$, the rate of phagocytosis under various conditions, such as addition of a drug or a reagent can also be analyzed. Recent studies have also highlighted the impairment of microglial clearance of the Aβ plaques in AD mouse models.[22,23] Therefore, $hA\beta^{pH}$ can be used to differentiate between phagocytic and non-phagocytic populations of microglia.

Methods and Materials

Human or recombinant (mouse, rat etc.) beta-amyloid with amino acid sequence 1-42 or 1-40 or any other fragments is used for the conjugation with pH-responsive fluorophore or near-infra red dye. The conjugation between amino acid sequence and fluorophore is achieved by making new bonds or incorporating new linkers using following chemistry but not limited to the heterocycle as a linker. A conjugation is performed using either N/C-terminal or reactive side chain of amino acid residue. It could be one or multiple conjugation on monomer, oligomer or fibrillar form of beta-amyloid.

The above-mentioned chemistry or extension of similar chemistry is used to link fluorophore with beta-Amyloid or its fragments. For example, (a) amide bond formation using amine functional group of peptide and activated ester/carboxylic acid functional group of fluorophore; (b) oxadiazole formation involving carboxylic acid (peptide), amine and/or aldehyde of fluorophore; (c,h) "click chemistry" between azide and unstrained or strained alkyne functional group; (d) reductive elimination; (e,f) site-selective arylation of tryptophan and/or histidine; (g) cycloaddition using tetrazine and alkene; (i) PEGylated linkers containing activated esters, azide, carboxylic acid, amines Synthesis of the hAβ$^{pH}$:

Human Aβ1-42 peptide (Cat #AS-20276) was purchased from AnaSpec. Fluorescent dye Protonex Green 500 SE was purchased from AAT Bioquest (Cat #21216). Recombinant Aβ(M1-42) was expressed in-house.

The hAβ$^{pH}$ conjugate was synthesized by linking the human Aβ1-42 peptide to the amine reactive Protonex Green 500, SE (PTXG) fluorophore. The procedure to prepare conjugate is below:

Solution A: Aβ (0.2 mg, 0.044 µmol or any other quantity) solution was prepared in 1M NaHCO$_3$ (50-200 µL or more) (or any other basic buffer with variable molar concentration). Solution B: Protonex-Green 500, SE dye solution (10 equiv) was prepared in DMSO or prepare a stock solution of Protonex-Green 500, SE dye in DMSO. Solution A and B were mixed. The reaction mixture was incubated at room temperature (RT) for 3 hours in dark (wrapped in aluminum foil) then add 5 equiv of Protonex-Green 500, SE dye and continue incubation for 2-3 hours. The crude reaction mixture was diluted with deionized or ultrapure water (1 mL or more) and the conjugated product was dialyzed by Pierce Protein Concentrators (Fisher Scientific) or Amicon® centrifugal filter unit (Millipore Sigma) (PES, 3K MWCO) at 3500 g to 4500 g for 30-90 minutes in swinging bucket centrifuge to remove small molecular weight fragments. The concentrated solution was diluted with deionized water (0.5 mL) and dialyzed again for 15-30 minutes as done previously. Finally, MALDI spectra was recorded, which confirmed the conjugation of pH-sensitive fluorophore with Aβ.

The MALDI spectra clearly demonstrated the PTXG conjugation with the Aβ1-42 peptide with a removal of the succinimidyl ester (SE) as a leaving group. In addition, $^1$H-NMR of Aβ, PTXG and hAβ$^{pH}$ indicates the presence of PTXG as well as Aβ1-42 peptide. The ATR-FTIR spectrum of Aβ1-42 peptide exhibits a strong absorption peak at 1625 cm$^{-1}$. The ATR-FTIR spectrum of PTXG shows the presence of amide and ester group exhibiting absorption peaks at 1755 and 1727 cm$^{-1}$. Evidently, conjugated product hAβ$^{pH}$ shows a distinct amide peak at 1674 cm$^{-1}$. Collectively, these experiments suggest the formation of the hAβ$^{pH}$ conjugate.

We have also synthesized a conjugate of the Aβ1-42 peptide with pHrodo-Red™, NHS fluorophore (RODO) and confirmed the conjugate formation from MALDI spectrum (FIG. 9).

Additional chemistry for the synthesis of peptide conjugate is performed according to the following scheme:

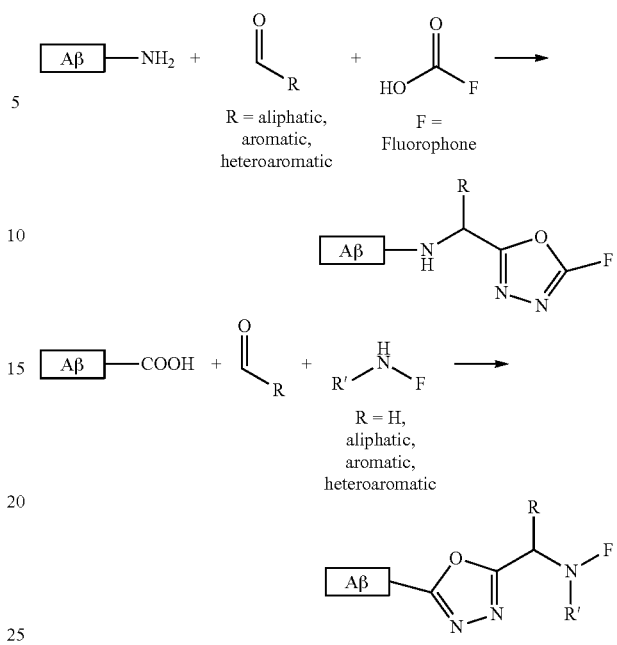

The synthesis of peptide conjugate using beta-amyloid, aldehyde containing reagent, fluorophore (with amine or carboxylic acid) and (N-Isocyanoimino)triphenyl phosphorane. Procedure: In a clean, dried vial a mixture of peptide, aldehyde, (N-Isocyanoimino)triphenyl phosphorane and fluorophore taken in a solvent (organic or aqueous solution) and stirred at room temperature to 40° C. for a few hours. The purification and characterization of the prepared conjugate was similar to the procedure described for hAβ$^{pH}$.

The beta-amyloid peptide may be from different species—mouse, rat, human, non-human primates (monkey)—the non-human primates can be used as the animal model for Alzheimer's disease along with mouse and rat. The human pH-dependent beta-amyloid peptide conjugate (pH-Abeta) may be used for mouse and rat brains via injections for diagnostics and other research purposes.

Live Cell Tracking of Microglial Phagocytosis:

To identify and visualize the phagocytosis of synthesized Aβ-dye conjugates, immortalized microglial cells HMC3 (human), BV2 (mouse), and N9 (mouse) were seeded at a concentration of 5000 cells per well in a 96-well plate. After overnight incubation in a 37° C., 5% CO$_2$ incubator for allowing the cells to adhere to the surface, various concentrations of the Aβ-dye conjugates (500 ng to 10 µg per well) were added to the cells. The cells were imaged in the IncuCyte S3 system every 10 mins for a 24-hour period.

Observations: Phagocytosis was observed in all three cell lines. Furthermore, ramified microglia with broad cellular structures and elongated branches developed an amoeboid morphology upon engulfing the Aβ-dye conjugates, as expected. The fluorescence signal within the cells sustained through the imaging.

Experimental Methods

Human amyloid beta (Aβ, 1-42) (#AS-20276) was purchased from AnaSpec, Inc. Recombinant Aβ(M1-42) was expressed in-house. Protonex Green 500 (#21215) was purchased from AAT Bioquest, Inc. pHrodo-Red SE (#P36600) and Propidium Iodide (#P1304MP) was purchased from Thermo Fisher Scientific. Pierce™ Protein Concentrator PES (#PI88514), 2 to 6 mL was purchased from Fisher Scientific. Amicon® centrifugal filter unit (0.5-15 mL) was purchased from Millipore Sigma (e.g. cat #Z740186). To label the actin filaments for visualizing cell cytoplasm, Phalloidin-iFluor 555 Reagent (#ab176756) was purchased from Abcam. DAPI (4',6-Diamidino-2-Phenylindole, Dilactate) (#D3571) was purchased from Invitrogen to label the cellular nuclei. LysoTracker™ Red DND-99 (#L7528) was purchased from Thermo Fisher Scientific. All other chemical reagents including formaldehyde, DMEM and DMEM/F12 medium, DMSO, PBS, etc. were purchased from commercial suppliers. MALDI spectra were obtained using Applied Biosystems Voyager DE PRO instrument (Main parameters: Number of laser shots: 100/spectrum, Laser intensity: 2977, Laser rep rate: 20.0 Hz, accelerating voltage 25000 V). $^1$H-NMR spectra were obtained in DMSO-$d_6$ using a Bruker AV-III-500-HD 500 MHz NMR instrument. ATR-FTIR spectra were recorded using ThermoFisher Nicolet FTIR instrument.

Synthesis of pH-Sensitive Fluorescent Human Aβ Conjugate (Protonex Green®-hAβ$^{pH}$)

Solution A: Aβ (0.2 mg, 0.044 μmol or any other quantity) solution was prepared in 1M NaHCO$_3$ (50-200 μL or more) (or any other basic buffer with variable molar concentration). Solution B: Protonex-Green 500, SE dye solution (10 equiv) was prepared in DMSO or prepare a stock solution of Protonex-Green 500, SE dye in DMSO. Solution A and B were mixed. The reaction mixture was incubated at room temperature (RT) for 3 hours in dark (wrapped in aluminum foil) then add 5 equiv of Protonex-Green 500, SE dye and continue incubation for 2-3 hours. The crude reaction mixture was diluted with deionized or ultrapure water (1 mL or more) and the conjugated product was dialyzed by Pierce Protein Concentrators (Fisher Scientific) or Amicon® centrifugal filter unit (Millipore Sigma) (PES, 3K MWCO) at 3500 g to 4500 g for 30-90 minutes in swinging bucket centrifuge to remove small molecular weight fragments. The concentrated solution was diluted with deionized water (0.5 mL) and dialyzed again for 15-30 minutes as done previously. Finally, MALDI spectra was recorded, which confirmed the conjugation of pH-sensitive fluorophore with Aβ.

Synthesis of pH-Sensitive Fluorescent Human Aβ Conjugate (pHrodo Red-hAβ$^{pH}$):

Solution A: Aβ (0.2 mg, 0.044 μmol or any other quantity) solution was prepared in 1M NaHCO$_3$ (50-200 μL or more) (or any other basic buffer with variable molar concentration). Solution B: pHrodo Red-NHS stock solution was prepared in DMSO. Solution A and B (10 equiv from a stock solution) were mixed. The reaction mixture was incubated at room temperature for 3 hours (wrapped with aluminum foil, then add 5 equiv of Protonex-Green 500, SE dye and continue incubation for 2-3 hours. The crude reaction mixture was diluted with deionized or ultrapure water (1 mL or more) and the conjugated product was dialyzed by Pierce Protein Concentrators (Fisher Scientific) or Amicon® centrifugal filter unit (Millipore Sigma) (PES, 3K MWCO) at 3500 g to 4500 g for 30-90 minutes in swinging bucket centrifuge to remove small molecular weight fragments. The concentrated solution was diluted with deionized water (0.5 mL) and dialyzed again for 15-30 minutes as done previously.

Emission Spectra of the Protonex Green Conjugated Aβ (PTXG-hAβ$^{pH}$) at Various pH Conditions The cell culture medium was treated with dilute HCl and NaOH solutions to obtain different solutions with pH of 1.0 to 9.0 for the assay. Lyophilized powder of hAβ pH was diluted in cell culture medium to make a stock solution. Different dilutions for each pH condition was prepared at concentrations of 0.5, 1.0, 2.0, and 5.0 μM in a 96-well plate. Fluorescence intensity of each well containing hAβ$^{pH}$ in was obtained on the Cytation™ 5 imaging multi-mode reader (BioTek Instruments) at 443/505 nm excitation/emission wavelengths. The fluorescence intensity of each pH-solution and hAβ$^{pH}$-concentration in relative fluorescence units (RFU) was analyzed using GraphPad Prism software.

Aggregation of hAβ$^{pH}$

Solution of Protonex Green® (PTXG) and hAβ$^{pH}$ was prepared in cell culture medium at different concentrations of 0, 0.1, 0.5, 1.0, 2.0, 5.0 μM and 50 μL of each concentration was added in duplicates to the wells of a 96-well plate. To measure florescence with PTXG and hAβ$^{pH}$ at different concentrations, we optimized each well with a final pH of 3.0 by adding 7.5 μL of pH 1.0 solution (hydrochloric acid in media). Fluorescence intensity of the acidic solutions was measured at 443/505 nm on Cytation 5. The plate was incubated at 37° C., 5% $CO_2$ and fluorescence measured at 2, 6, 12, and 24-hour time points. The change in fluorescence intensity of the PTXG and hAβ$^{pH}$ aggregates was analyzed over time using GraphPad Prism.

AFM Analysis of Aβ and hAβ$^{pH}$

AFM sample preparation: The manufacturer's protocol was followed for sample preparation, image acquiring and analysis.

Preparation of HFIP-Treated Aβ and hAβ$^{pH}$ Peptide Stocks 1 mM Aβ solution was prepared by adding HFIP directly to the vial (0.5 mg Aβ or hAβ$^{pH}$ or recombinant Aβ(M1-42) in 93.35 μL HFIP). The peptide should be completely dissolved. The solution was incubated at room temperature (RT) for at least 30 min. HFIP was allowed to evaporate in the open tubes overnight in the fume hood or using Argon/Nitrogen gas and then dry down under high vacuum for 1 h without heating to remove any remaining traces of HFIP and moisture. The resulting peptide thin clear film formed at the bottom of the tubes. The tubes containing dried peptides were stored at −20° C. until further use.

Oligomeric Aβ Preparation

Prior to use, tube containing peptide film was allowed to come to RT. Then, 5 mM Aβ DMSO stock was prepared by adding 20 μL fresh dry DMSO to 0.45 mg. Pipette thoroughly, scraping down the sides of the tube near the bottom to ensure complete resuspension of peptide film. Vortex well (~30 sec) and pulse in a microcentrifuge to collect solution at the bottom of the tube. Sonicate 5 mM Aβ DMSO solution for 10 min. Use this preparation as the starting material for unaggregated Aβ and oligomeric Aβ. For oligomer formation, samples were incubated at 4° C. for 24 hr.

Atomic Force Microscopy—Sample Preparation

Sample preparation was done with proper sterile technique with sterile media and MilliQ-water. A 10 mL syringe with ultrapure water and equip with a 0.22 m filter was filled and the initial 1-2 mL was discarded though syringe filter output. 1M HCl and 1×PBS buffer were also filtered through 0.22 um filter.

Dilution of samples: Prepare samples for spotting on mica by diluting to final concentrations of 10-30 μM in water.

Mica preparation: Immediately before sample delivery, top few layers of mica was cleaved away using adhesive tape to reveal a clean, flat, featureless surface. The fresh surface was pre-treated with ~5-8 μL of filtered 1M HCl to for 30 s and rinse with two drops of water (note: held the mica at a 450 angle and wash with water so that water coming out of the syringe filter roll over the mica). If necessary, the remaining water was absorbed with fiber-free tissue paper/wipes by keeping paper on the edge of the mica. Immediately sample was spotted onto mica and incubated for 3 min. Rinse it with three drops of water and blow dry with several gentle pulses of compressed air. Samples were kept in a box and incubated on benchtop for a few minutes to hours at room temperature until analysis.

AFM imaging. Instrument: Veeco Multimode with NanoScope V controller with NanoScope Software. Mode: Tapping mode. AFM probe: Silicon AFM probes, TAβ300 Aluminum reflex coating (Ted Pella, Inc. Cat #TAβ300AL-G-10), ~300 kHz resonant frequency and ~40 N/m force constant.

Cell Culture

BV2 and N9 mouse microglial cell lines were generously gifted by Dr. Linda J. Van Eldik (University of Kentucky, USA). Cells were maintained at 37° C. and 5% $CO_2$ in DMEM (Dulbecco's Modified Eagle's Medium)/Hams F-12 50/50 Mix (Corning #10-090-CV) supplemented with 10% FBS (Atlanta Biologics), 1% L-Glutamine (Corning #25-005-CI), and 1% Penicillin/Streptomycin (Invitrogen). HMC3 human microglial cell lines were a gift from Dr. Jianming Li (Purdue University, USA) who originally obtained the cells from ATCC. These cells were maintained at 37° C. and 5% $CO_2$ in DMEM supplemented with 10% FBS and 1% Penicillin/Streptomycin.

Phagocytosis Assay with Live Cells

Cells were seeded at 5000 cells per well (200 μL per well) in a 96-well flat bottom plate (Falcon) for approximately 16 hours (overnight). The lyophilized $hA\beta^{pH}$ conjugate was dissolved in the culture medium for each cell type and filtered using 0.22 μm syringe filter. The adherent cells (BV2, N9, HMC3) were treated with a final concentration of $hA\beta^{pH}$ at 0, 0.1, 0.5, 1.0, 2.0, and 5.0 μM by replacing one-half of the culture medium (100 μL) with 2× concentration. Two technical replicates were used for each treatment concentration. The plates were immediately placed in the IncuCyte® S3 Live-Cell Analysis System (Essen BioScience) and four images per well were captured at 30-minute time intervals for 24 hours. The fluorescence intensity, cell confluence, and the integrated fluorescence intensity data was obtained and analyzed using the GraphPad Prism® software. The total $hA\beta^{pH}$ phagocytosis per concentration was calculated as:

$$\frac{\text{Relative Total integrated intensity }(t)(\frac{CUx\mu m^2}{\text{Image}})}{\text{Maximum Relative Total Integrated Intensity}(\frac{CUx\mu m^2}{\text{Image}})}$$

wherein, Total Integrated Intensity is defined as the total sum of $hA\beta^{pH}$'s fluorescent intensity in the image and Relative Total Integrated Intensity is defined as Total Integrated Intensity (t)—Total Integrated Intensity (t=0) for each concentration.

Flow Cytometry Analysis of BV-2 Microglia Phagocytosis

BV2 microglial cells were seeded at a density of 250 k cells/well in a 6-well plate for around 14 hr overnight. The next morning, the cells were treated with 5 μM and 500 nM $hA\beta^{pH}$ and placed in the 37 C incubator for 2 hours. After 2 hours, the plate was brought to the hood, placed on ice to stop phagocytosis, and cell culture medium containing $hA\beta^{pH}$ was aspirated. The cells were washed once with cold PBS. Next, the cells were treated with ice cold PBS with 2 mM EDTA for 2 mins on ice to initiate detachment of the cells from the wells. The cells were fully detached from the wells with very gentle pipetting and transferred into falcon tubes. The cells were centrifuged once at 1400 RPM for 3 mins. The PBS/EDTA supernatant was aspirated out and the cell pellets were re-suspended in FACS buffer (PBS, 25 mM HEPES, 2 mM EDTA, and 2% FBS). Five minutes before analysis of each sample tube, Propidium Iodide (PI) was added to the sample (40 ng/1 mL cell suspension) for staining of live/dead cells. Cells exhibiting green fluorescence were captured on the FIT-C channel upon gating for live cells on the PE channel (PI⁻ negative cells are taken as live cells) on the Beckman Coulter's CytoFLEX platform. The filed were then analyzed on FlowJo V10 software. Gating strategy is indicated in FIG. 4 on the main manuscript.

Confocal Imaging of Actin Filaments and Nuclei in the Paraformaldehyde-Fixed Phagocytic Microglial Cells For labeling the cells with Phalloidin and DAPI, 20,000 cells/250 μL were plated in 14 mm microwells of the 35 mm glass bottom dishes (MatTek #P35G-1.5-14-C) and kept overnight. The cells were treated with 5.0 μM $hA\beta^{pH}$ for 2 hours on the next day. Then the medium was aspirated, and cells were fixed with 4% paraformaldehyde for 20 mins, and then gently washed once with PBS. Phalloidin-iFluor 555 reagent was diluted at a concentration of 1 μL/mL in PBS and added to the fixed cells for 10 minutes for staining the actin filaments. To label the nuclei, DAPI was diluted at a concentration of 1 μL/mL. The cells were washed again with PBS followed by a 10-minute incubation with the diluted DAPI solution. Finally, the DAPI solution was aspirated and the fixed cells treated with 2-3 drops of ProLong™ Gold Antifade Mountant (Invitrogen #P36930) before imaging. Fluorescence images of phagocytic microglial cells were captured using 40× and 60× objectives on the Nikon AR-1 MP confocal laser microscope. Images were obtained on the NIS Elements microscope imaging software.

Confocal Imaging of the Intracellular Acidic Organelles and Nuclei in the Paraformaldehyde-Fixed Phagocytic Microglial Cells LysoTracker® Red DND-99 was used for labeling the intracellular organelles of the cells to observe localization of $hA\beta^{pH}$ sensors inside the cells after phagocytosis. 20,000 cells/250 μL were plated in 14 mm microwells of the 35 mm glass bottom dishes (MatTek #P35G-1.5-14-C) and kept overnight. The cells were treated with 5.0 μM $hA\beta^{pH}$ for 2 hours on the next day. Then the $hA\beta^{pH}$-containing medium was aspirated and replaced with 200 μL of media containing 100 nM concentration of the LysoTracker® dye and the cells were incubated in the 37° C., 5% $CO_2$ incubator for 30 minutes. Finally, the cells were fixed and treated with DAPI to stain the nucleus followed by 2-3 drops of ProLong™ Gold Antifade Mountant using the above-mentioned protocol. Fluorescence images of phagocytic microglial cells were captured using 40× and 60× objectives on the Nikon AR-1 MP confocal laser microscope. Images were obtained on the NIS Elements microscope imaging software.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

REFERENCES CITED (1) Li, Q.; Barres, B. A. Microglia and Macrophages in Brain Homeostasis and Disease. Nat. Rev. Immunol. 2017.
(2) Nimmerjahn, A.; Kirchhoff, F.; Helmchen, F. Resting Microglial Cells Are Highly Dynamic Surveillants of Brain Parenchyma in Vivo. Science 2005, 308 (5726), 1314-1318.
(3) Hanke, M. L.; Kielian, T. Toll-like Receptors in Health and Disease in the Brain: Mechanisms and Therapeutic Potential. Clin. Sci. (Lond). 2011, 121 (9), 367-387.
(4) Okun, E.; Mattson, M. P.; Arumugam, T. V. Involvement of Fc Receptors in Disorders of the Central Nervous System. Neuromolecular Med. 2010, 12 (2), 164-178.
(5) Husemann, J.; Loike, J. D.; Anankov, R.; Febbraio, M.; Silverstein, S. C. Scavenger Receptors in Neurobiology and Neuropathology: Their Role on Microglia and Other Cells of the Nervous System. Glia 2002, 40 (2), 195-205.
(6) Bachstetter, A. D.; Van Eldik, L. J.; Schmitt, F. A.; Neltner, J. H.; Ighodaro, E. T.; Webster, S. J.; Patel, E.; Abner, E. L.; Kryscio, R. J.; Nelson, P. T.; et al. Disease-Related Microglia Heterogeneity in the Hippocampus of Alzheimer's Disease, Dementia with Lewy Bodies, and Hippocampal Sclerosis of Aging. Acta Neuropathol. Commun. 2015, 3, 32.
(7) Liddelow, S. A.; Guttenplan, K. A.; Clarke, L. E.; Bennett, F. C.; Bohlen, C. J.; Schirmer, L.; Bennett, M. L.; Munch, A. E.; Chung, W.-S.; Peterson, T. C.; et al. Neurotoxic Reactive Astrocytes Are Induced by Activated Microglia. Nature 2017, 541 (7638), 481-487.
(8) Heneka, M. T.; Carson, M. J.; Khoury, J. El; Landreth, G. E.; Brosseron, F.; Feinstein, D. L.; Jacobs, A. H.; Wyss-Coray, T.; Vitorica, J.; Ransohoff, R. M.; et al. Neuroinflammation in Alzheimer's Disease. The Lancet Neurology. 2015, pp 388-405.
(9) O'Brien, R. J.; Wong, P. C. Amyloid Precursor Protein Processing and Alzheimer's Disease. Annu. Rev. Neurosci. 2011, 34, 185-204.
(10) Selkoe, D. J. Alzheimer's Disease: Genes, Proteins, and Therapy.
(11) Jones, R. S.; Minogue, A. M.; Connor, T. J.; Lynch, M. A. Amyloid-β-Induced Astrocytic Phagocytosis Is Mediated by CD36, CD47 and RAGE. J. Neuroimmune Pharmacol. 2013, 8 (1), 301-311.
(12) Koenigsknecht, J.; Landreth, G. Microglial Phagocytosis of Fibrillar Beta-Amyloid through a Beta1 Integrin-Dependent Mechanism. J. Neurosci. 2004, 24 (44), 9838-9846.
(13) Ribes, S.; Ebert, S.; Czesnik, D.; Regen, T.; Zeug, A.; Bukowski, S.; Mildner, A.; Eiffert, H.; Hanisch, U.-K.; Hammerschmidt, S.; et al. Toll-like Receptor Prestimulation Increases Phagocytosis of Escherichia Coli DH5alpha and Escherichia Coli K1 Strains by Murine Microglial Cells. Infect. Immun. 2009, 77 (1), 557-564.
(14) Hassan, S.; Eldeeb, K.; Millns, P. J.; Bennett, A. J.; Alexander, S. P. H.; Kendall, D. A. Cannabidiol Enhances Microglial Phagocytosis via Transient Receptor Potential (TRP) Channel Activation. Br. J. Pharmacol. 2014, 171 (9), 2426-2439.
(15) Paresce, D. M.; Ghosh, R. N.; Maxfield, F. R. Microglial Cells Internalize Aggregates of the Alzheimer's Disease Amyloid β-Protein Via a Scavenger Receptor. Neuron 1996, 17 (3), 553-565.
(16) Galatro, T. F.; Holtman, I. R.; Lerario, A. M.; Vainchtein, I. D.; Brouwer, N.; Sola, P. R.; Veras, M. M.; Pereira, T. F.; Leite, R. E. P.; Möller, T.; et al. Transcriptomic Analysis of Purified Human Cortical Microglia Reveals Age-Associated Changes. Nat. Neurosci. 2017, 20 (8), 1162-1171.
(17) Liu, S.; Liu, Y.; Hao, W.; Wolf, L.; Kiliaan, A. J.; Penke, B.; Rube, C. E.; Walter, J.; Heneka, M. T.; Hartmann, T.; et al. TLR2 Is a Primary Receptor for Alzheimer's Amyloid Peptide To Trigger Neuroinflammatory Activation. J. Immunol. 2012, 188 (3), 1098-1107.
(18) Liu, Y.; Walter, S.; Stagi, M.; Cherny, D.; Letiembre, M.; Schulz-Schaeffer, W.; Heine, H.; Penke, B.; Neumann, H.; Fassbender, K. LPS Receptor (CD14): A Receptor for Phagocytosis of Alzheimer's Amyloid Peptide. Brain 2005, 128 (8), 1778-1789.
(19) Zhao, Y.; Wu, X.; Li, X.; Jiang, L.-L.; Gui, X.; Liu, Y.; Sun, Y.; Zhu, B.; Pina-Crespo, J. C.; Zhang, M.; et al. TREM2 Is a Receptor for β-Amyloid That Mediates Microglial Function. Neuron 2018, 97 (5), 1023-1031.e7.
(20) Ajami, B.; Samusik, N.; Wieghofer, P.; Ho, P. P.; Crotti, A.; Bjornson, Z.; Prinz, M.; Fantl, W. J.; Nolan, G. P.; Steinman, L. Single-Cell Mass Cytometry Reveals Distinct Populations of Brain Myeloid Cells in Mouse Neuroinflammation and Neurodegeneration Models. Nat. Neurosci. 2018, 21 (4), 541-551.
(21) Keren-Shaul, H.; Spinrad, A.; Weiner, A.; Matcovitch-Natan, O.; Dvir-Szternfeld, R.; Ulland, T. K.; David, E.; Baruch, K.; Lara-Astaiso, D.; Toth, B.; et al. A Unique Microglia Type Associated with Restricting Development of Alzheimer's Disease. Cell 2017, 169 (7), 1276-1290.e17.
(22) Mildner, A.; Schlevogt, B.; Kierdorf, K.; Böttcher, C.; Erny, D.; Kummer, M. P.; Quinn, M.; Bruck, W.; Bechmann, I.; Heneka, M. T.; et al. Distinct and Non-Redundant Roles of Microglia and Myeloid Subsets in Mouse Models of Alzheimer's Disease. J. Neurosci. 2011, 31 (31), 11159-11171.
(23) Grathwohl, S. A.; Kalin, R. E.; Bolmont, T.; Prokop, S.; Winkelmann, G.; Kaeser, S. A.; Odenthal, J.; Radde, R.; Eldh, T.; Gandy, S.; et al. Formation and Maintenance of Alzheimer's Disease β-Amyloid Plaques in the Absence of Microglia. Nat. Neurosci. 2009, 12 (11), 1361-1363.

What is claimed is:

1. A composition matter useful for Alzheimer's disease research, diagnosis, and treatment comprising A-L-F or a pharmaceutically acceptable salt thereof, wherein A is a beta-amyloid peptide or a fragment thereof, L is an optional linker and F is a pH-responsive fluorophore or dye; wherein F is the compound

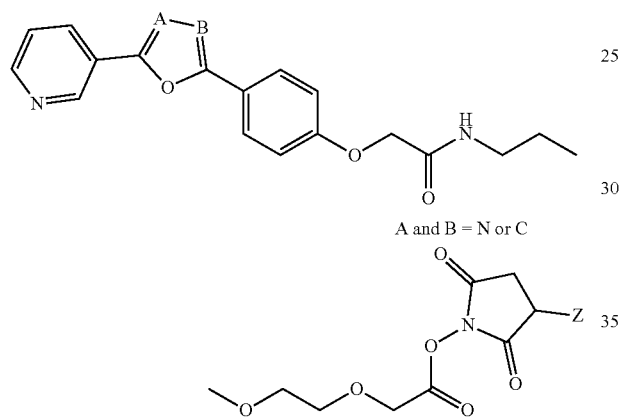

A and B = N or C or a near-infra red dye selected from the compounds

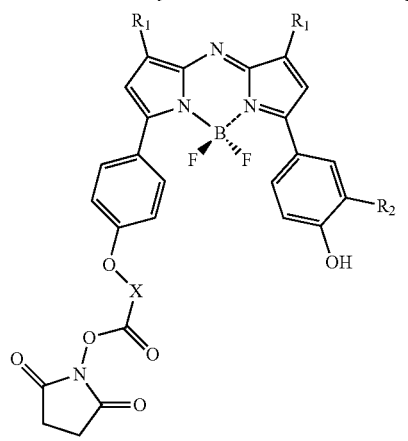

$R_1$ = Ph, 4-Fluoro Phenyl,
1-methyl-4-phenylpiperazine,
4-phenylpiperazine,
4-phenylmorpholine,
4-phenyl dialkylamine
$R_1$ = $NO_2$, H
n = $CH_2$, PEG linker

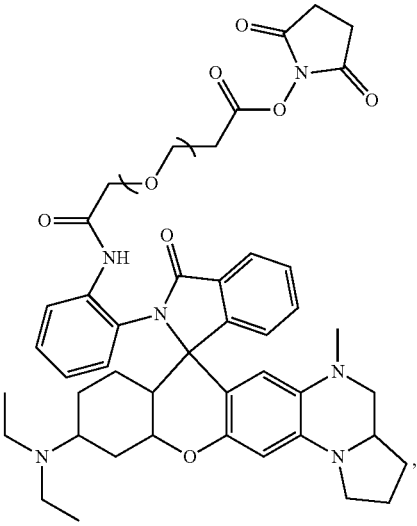

or an acceptable salt thereof.

2. The composition matter of claim 1, wherein said beta-amyloid peptide is a beta-amyloid peptide of human or an animal.

3. The composition matter of claim 1, wherein said beta-amyloid peptide is beta-amyloid peptide comprising the sequence of SEQ ID NO: 1 or SEQ ID NO: 15, or a fragment of any continuous 11 or more amino acid residues thereof.

4. The composition matter of claim 1, wherein said optional linker is absent or comprises

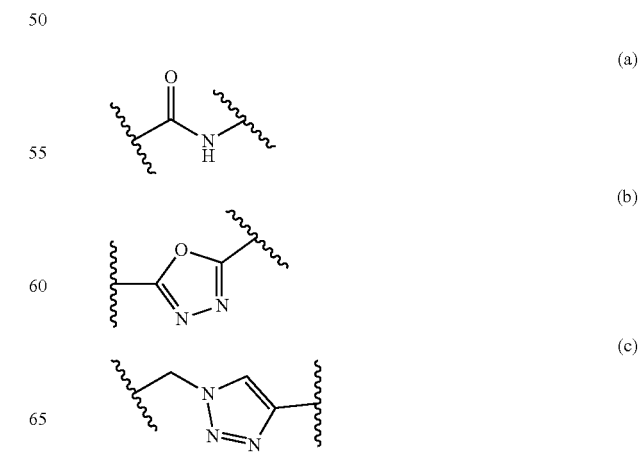

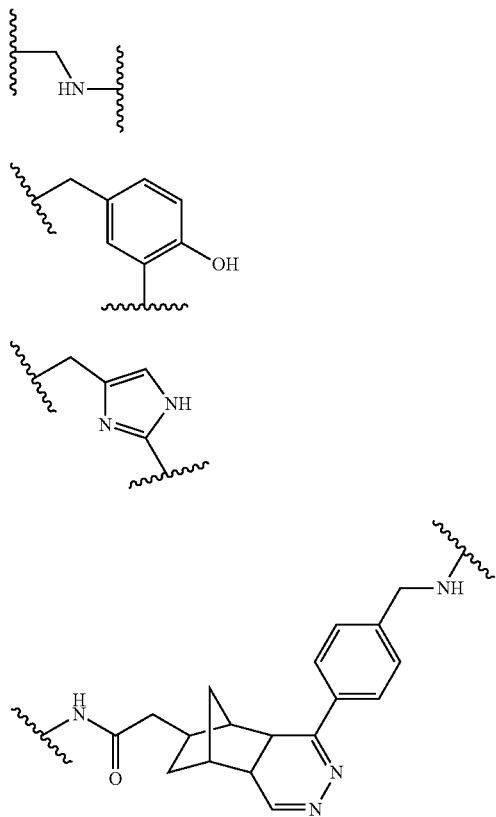

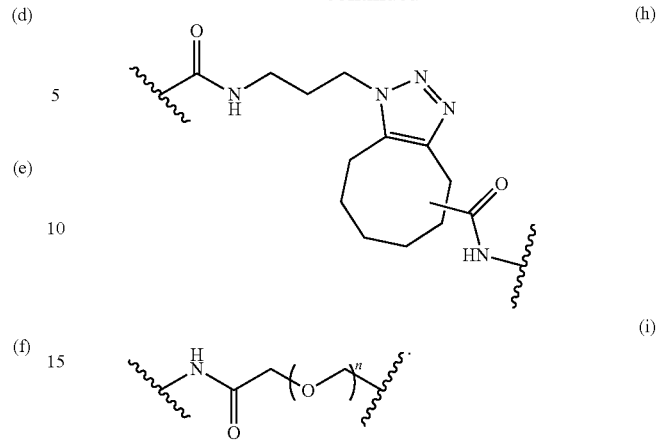

5. A method for diagnosis of Alzheimer's disease comprising the steps of
   a. preparing a composition matter comprising A-L-F or a pharmaceutically acceptable salt thereof, wherein A is beta-amyloid peptide or a fragment thereof, L is an optional linker and F is a pH-responsive fluorophore or dye;
   b. administering said composition matter to a study subject and collecting related imaging data such as sorting phagocytic Abeta+ and non-phagocytic Abeta-cells;
   c. analyzing said imaging data and comparing with that of a healthy subject; and
   d. concluding disease state of said study subject; wherein F is the compound

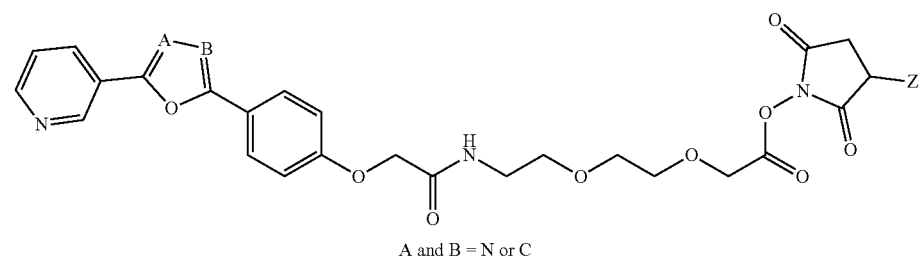

A and B = N or C or a near-infra red dye selected from the compounds

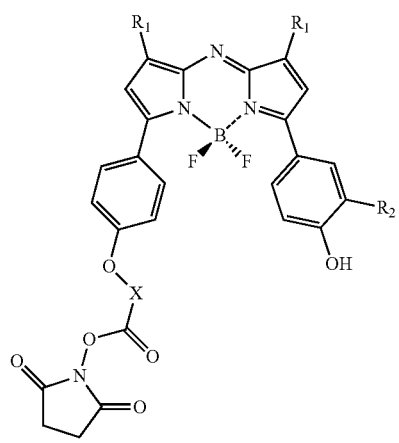

R₁ = Ph, 4-Fluoro Phenyl,
1-methyl-4-phenylpiperazine,
4-phenylpiperazine,
4-phenylmorpholine,
4-phenyl dialkylamine
R₂ = NO₂, H
n = CH₂, PEG linker

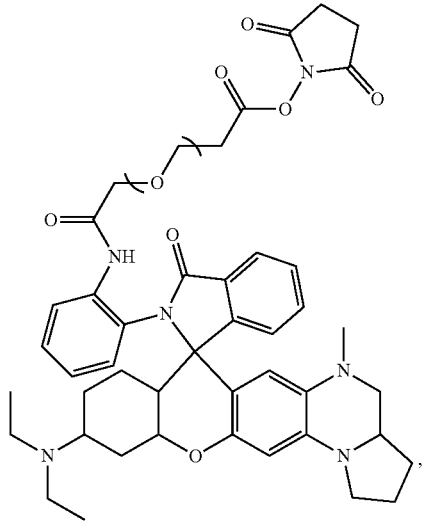

or an acceptable salt thereof.

6. The method according to claim 5, wherein said beta-amyloid peptide is a beta-amyloid peptide of human or an animal.

7. The method according to claim 5, wherein said beta-amyloid peptide is beta-amyloid peptide comprising the sequence of SEQ ID NO: 1 or SEQ ID NO: 15, or a fragment of any continuous 11 or more amino acid residues thereof.

8. The method according to claim 5, wherein said optional linker is absent or comprises

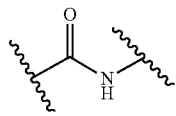 (a)

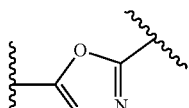 (b)

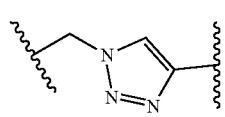 (c)

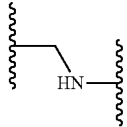 (d)

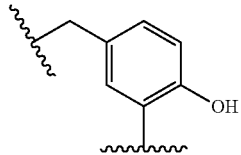 (e)

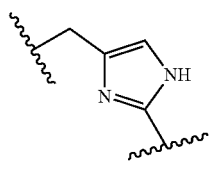 (f)

 (g)

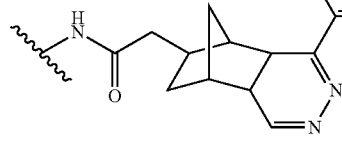 (h)

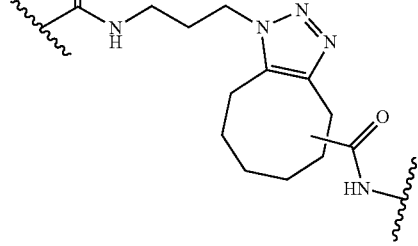

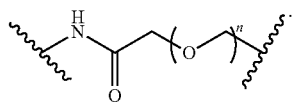 (i)

9. A kit for study and diagnosis of Alzheimer's disease comprising a composition matter comprising A-L-F or a pharmaceutically acceptable salt thereof, wherein A is beta-amyloid peptide or a fragment thereof, L is an optional linker and F is a pH-responsive fluorophore or dye; wherein F is the compound

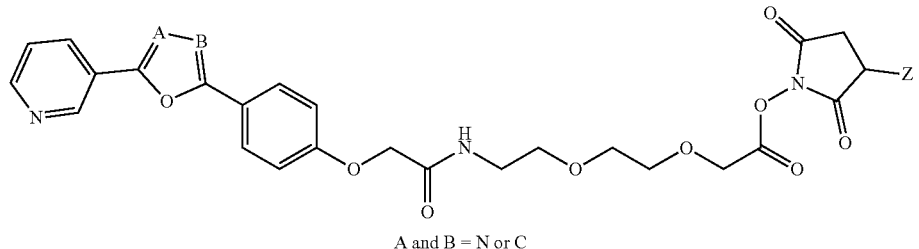

A and B = N or C or a near-infra red dye selected from the compounds

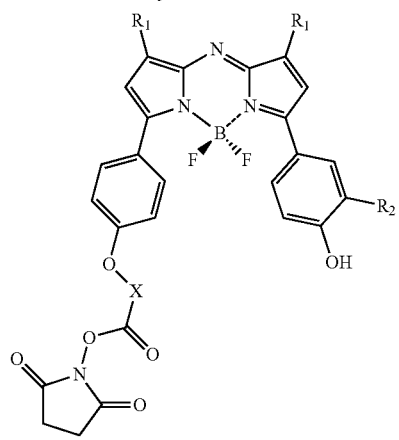

$R_1$ = Ph, 4-Fluoro Phenyl,
1-methyl-4-phenylpiperazine,
4-phenylpiperazine,
4-phenylmorpholine,
4-phenyl dialkylamine
$R_1$ = $NO_2$, H
n = $CH_2$, PEG linker

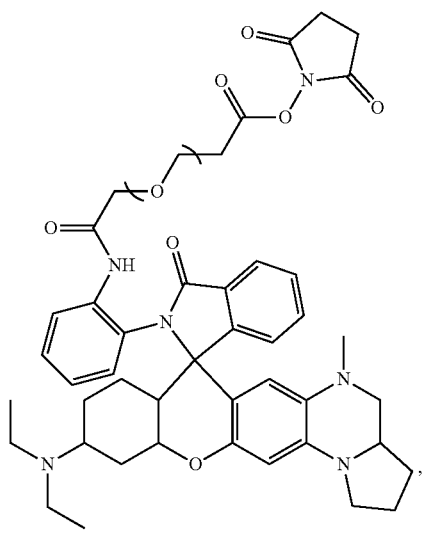

or an acceptable salt thereof.

10. The kit according to claim 9, wherein said optional linker is absent or comprises

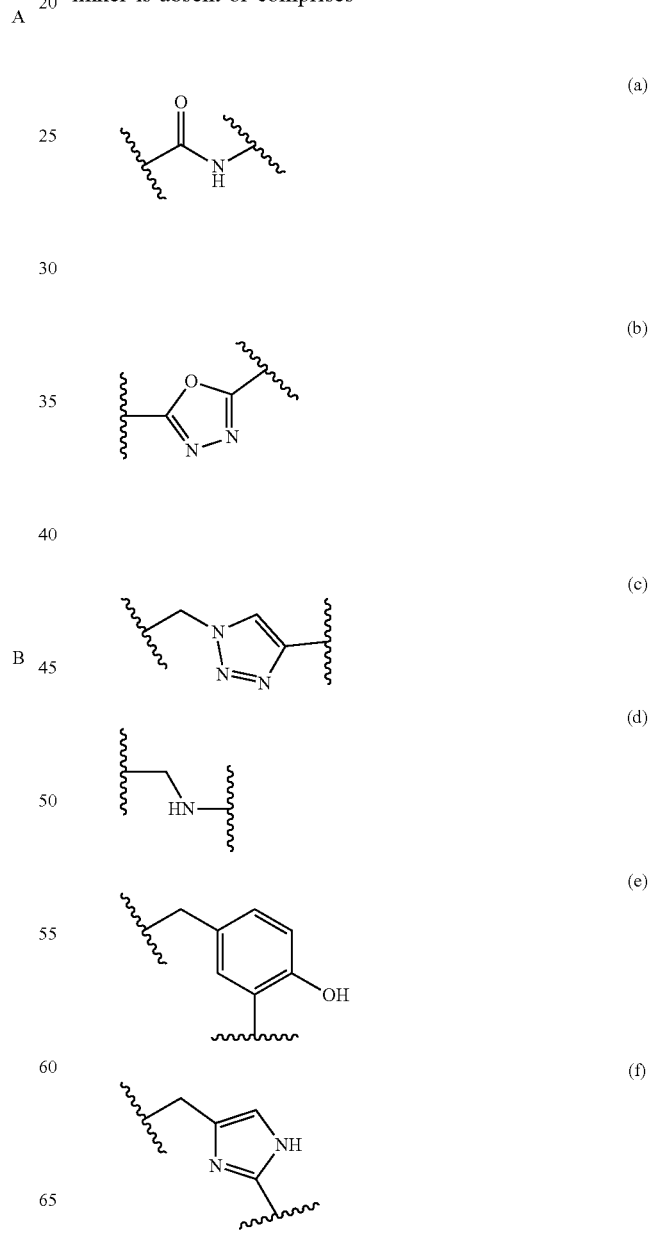

-continued
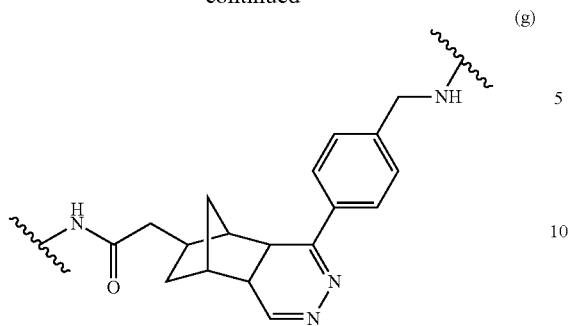
(g)
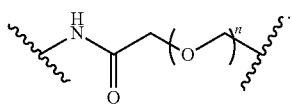
(h)
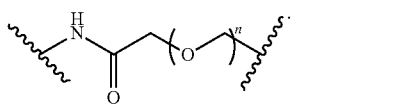
(i)
* * * * *

SEQUENCE LISTING

<160> NUMBER OF SEQ ID NOS: 16

<210> SEQ ID NO 1
<211> LENGTH: 42
<212> TYPE: PRT

<213> ORGANISM: Homo sapiens

<400> SEQUENCE: 1

Asp Ala Glu Phe Arg His Asp Ser Gly Tyr Glu Val His His Gln Lys
1               5                   10                  15
Leu Val Phe Phe Ala Glu Asp Val Gly Ser Asn Lys Gly Ala Ile Ile
            20                  25                  30
Gly Leu Met Val Gly Gly Val Val Ile Ala
        35                  40

<210> SEQ ID NO 2
<211> LENGTH: 41
<212> TYPE: PRT
<213> ORGANISM: Homo sapiens

<400> SEQUENCE: 2

Ala Glu Phe Arg His Asp Ser Gly Tyr Glu Val His His Gln Lys Leu
1               5                   10                  15
Val Phe Phe Ala Glu Asp Val Gly Ser Asn Lys Gly Ala Ile Ile Gly
            20                  25                  30
Leu Met Val Gly Gly Val Val Ile Ala
        35                  40

<210> SEQ ID NO 3
<211> LENGTH: 40
<212> TYPE: PRT
<213> ORGANISM: Homo sapiens

<400> SEQUENCE: 3

Glu Phe Arg His Asp Ser Gly Tyr Glu Val His His Gln Lys Leu Val
1               5                   10                  15
Phe Phe Ala Glu Asp Val Gly Ser Asn Lys Gly Ala Ile Ile Gly Leu
            20                  25                  30
Met Val Gly Gly Val Val Ile Ala
        35                  40

<210> SEQ ID NO 4
<211> LENGTH: 39
<212> TYPE: PRT
<213> ORGANISM: Homo sapiens

<400> SEQUENCE: 4

Phe Arg His Asp Ser Gly Tyr Glu Val His His Gln Lys Leu Val Phe
1               5                   10                  15
Phe Ala Glu Asp Val Gly Ser Asn Lys Gly Ala Ile Ile Gly Leu Met
            20                  25                  30
Val Gly Gly Val Val Ile Ala
        35

<210> SEQ ID NO 5
<211> LENGTH: 38
<212> TYPE: PRT
<213> ORGANISM: Homo sapiens

<400> SEQUENCE: 5

Arg His Asp Ser Gly Tyr Glu Val His His Gln Lys Leu Val Phe Phe
1               5                   10                  15
Ala Glu Asp Val Gly Ser Asn Lys Gly Ala Ile Ile Gly Leu Met Val
            20                  25                  30
Gly Gly Val Val Ile Ala

```
<210> SEQ ID NO 6
<211> LENGTH: 34
<212> TYPE: PRT
<213> ORGANISM: Homo sapiens

<400> SEQUENCE: 6

Gly Tyr Glu Val His His Gln Lys Leu Val Phe Phe Ala Glu Asp Val
1               5                   10                  15

Gly Ser Asn Lys Gly Ala Ile Ile Gly Leu Met Val Gly Gly Val Val
            20                  25                  30

Ile Ala

<210> SEQ ID NO 7
<211> LENGTH: 32
<212> TYPE: PRT
<213> ORGANISM: Homo sapiens

<400> SEQUENCE: 7

Glu Val His His Gln Lys Leu Val Phe Phe Ala Glu Asp Val Gly Ser
1               5                   10                  15

Asn Lys Gly Ala Ile Ile Gly Leu Met Val Gly Gly Val Val Ile Ala
            20                  25                  30

<210> SEQ ID NO 8
<211> LENGTH: 23
<212> TYPE: PRT
<213> ORGANISM: Homo sapiens

<400> SEQUENCE: 8

Phe Ala Glu Asp Val Gly Ser Asn Lys Gly Ala Ile Ile Gly Leu Met
1               5                   10                  15

Val Gly Gly Val Val Ile Ala
            20

<210> SEQ ID NO 9
<211> LENGTH: 21
<212> TYPE: PRT
<213> ORGANISM: Homo sapiens

<400> SEQUENCE: 9

Glu Asp Val Gly Ser Asn Lys Gly Ala Ile Ile Gly Leu Met Val Gly
1               5                   10                  15

Gly Val Val Ile Ala
            20

<210> SEQ ID NO 10
<211> LENGTH: 20
<212> TYPE: PRT
<213> ORGANISM: Homo sapiens

<400> SEQUENCE: 10

Asp Val Gly Ser Asn Lys Gly Ala Ile Ile Gly Leu Met Val Gly Gly
1               5                   10                  15

Val Val Ile Ala
            20

<210> SEQ ID NO 11
<211> LENGTH: 40
<212> TYPE: PRT
<213> ORGANISM: Homo sapiens
```

<400> SEQUENCE: 11

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
            35                  40

<210> SEQ ID NO 12
<211> LENGTH: 28
<212> TYPE: PRT
<213> ORGANISM: Homo sapiens

<400> SEQUENCE: 12

Asp Ala Glu Phe Arg His Asp Ser Gly Tyr Glu Val His His Gln Lys
1               5                   10                  15

Leu Val Phe Phe Ala Glu Asp Val Gly Ser Asn Lys
            20                  25

<210> SEQ ID NO 13
<211> LENGTH: 11
<212> TYPE: PRT
<213> ORGANISM: Homo sapiens

<400> SEQUENCE: 13

Gly Ser Asn Lys Gly Ala Ile Ile Gly Leu Met
1               5                   10

<210> SEQ ID NO 14
<211> LENGTH: 12
<212> TYPE: PRT
<213> ORGANISM: Homo sapiens

<400> SEQUENCE: 14

Glu Val His His Gln Lys Leu Val Phe Phe Ala Glu
1               5                   10

<210> SEQ ID NO 15
<211> LENGTH: 42
<212> TYPE: PRT
<213> ORGANISM: Rattus rattus

<400> SEQUENCE: 15

Asp Ala Glu Phe Gly His Asp Ser Gly Phe Glu Val Arg His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val Ile Ala
            35                  40

<210> SEQ ID NO 16
<211> LENGTH: 40
<212> TYPE: PRT
<213> ORGANISM: Rattus rattus

```
<400> SEQUENCE: 16

Asp Ala Glu Phe Gly His Asp Ser Gly Phe Glu Val Arg His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
        35              40
```